US006765664B2

(12) United States Patent
Groothuis et al.

(10) Patent No.: US 6,765,664 B2
(45) Date of Patent: Jul. 20, 2004

(54) LASER SCANNER WITH PARABOLIC COLLECTOR

(75) Inventors: David Scott Groothuis, Aurora, NE (US); Michael Thomas Hanchett, Edmonds, WA (US)

(73) Assignee: Delaware Capital Formation, Inc.

( * ) Notice: Subject to any disclaimer, the term of this patent is extended or adjusted under 35 U.S.C. 154(b) by 104 days.

(21) Appl. No.: 10/042,405

(22) Filed: Jan. 9, 2002

(65) Prior Publication Data

US 2003/0133128 A1 Jul. 17, 2003

(51) Int. Cl.[7] .............................................. G01B 11/26
(52) U.S. Cl. ...................................... 356/155; 33/258
(58) Field of Search ................................ 356/155, 620; 33/288, 203.18

(56) References Cited

U.S. PATENT DOCUMENTS

| | | | |
|---|---|---|---|
| 3,816,000 A | * 6/1974 | Fiedler ..................... 356/141.3 |
| 4,015,338 A | * 4/1977 | Kunze et al. ................. 33/228 |
| 4,513,508 A | * 4/1985 | Jarman et al. ................ 33/288 |
| 4,564,085 A | * 1/1986 | Melocik et al. ............. 187/224 |
| 4,997,283 A | 3/1991 | Danielson et al. |
| 5,029,397 A | * 7/1991 | Palombi ....................... 33/288 |
| 5,035,503 A | * 7/1991 | Sadeh et al. ............. 356/141.3 |
| 5,251,013 A | 10/1993 | Danielson et al. |
| 5,767,976 A | * 6/1998 | Ankerhold et al. ......... 356/437 |
| 5,801,834 A | * 9/1998 | Danielson et al. .......... 356/620 |
| 6,347,457 B1 | * 2/2002 | Espinoza et al. ............. 33/288 |
| D457,161 S | * 5/2002 | Groothuis et al. ......... D14/426 |

OTHER PUBLICATIONS

Color Photographs (4 on 1 page) of prior art scanner as shown in Chief Automotive Systems Brochure dated Jun. 1998, previously submitted.

Chief Automotive Systems Genesis brochure (6 pages in a 3–page trifold format) (Sep., 1996).
Chief Automotive Systems Genesis 2 Measuring System Owner's Manual (38 bound pages plus front, back, inside cover and warranty insert) (May, 1999).

* cited by examiner

*Primary Examiner*—Richard A. Rosenberger
(74) *Attorney, Agent, or Firm*—Kyle L. Elliott; Blackwell Sanders Peper Martin LLP

(57) ABSTRACT

An improved laser scanning apparatus (46) for determining frame or unibody alignment or misalignment of a vehicle (40) is provided, which includes a laser assembly (54), a pair of rotatable mirror assemblies (56,58) and laser detectors (114,116) located within an enclosed housing (50,52). The laser assembly (54) has an upper pair of lasers (122,126) located in known, spaced relationship above a lower pair of lasers (124,128); detector assemblies (114, 116) are also provided including substantially parabolic reflective surfaces (118a, 120a) with detectors (114a, 116a) disposed substantially at the focal point of the surfaces (118a, 120a). The apparatus (46) is used in conjunction with a plurality of individually coded reflective targets (44) which are suspended from known reference points on the vehicle (40). In use, the laser assembly (54) in conjunction with the mirror assemblies (56,58) directs upper and lower laser beams through 360 degree scans to impinge on the targets (44); laser radiation reflected from the targets (44) is detected by the detector assemblies (114, 116), allowing trigonometric calculation of target positions using information derived from the scans of the upper and lower beams. In this way, a determination can be made if any of the targets (44) are out of plumb (i.e., not truly vertical). Preferably, the housing (50,52) includes a pair of elongated, laser-transparent panels (88, 90) and is effectively sealed to minimize contamination of the apparatus (46). The provision of parabolic detection assemblies 114, 116 increases the signal-to-noise ratio for the apparatus (46).

15 Claims, 11 Drawing Sheets

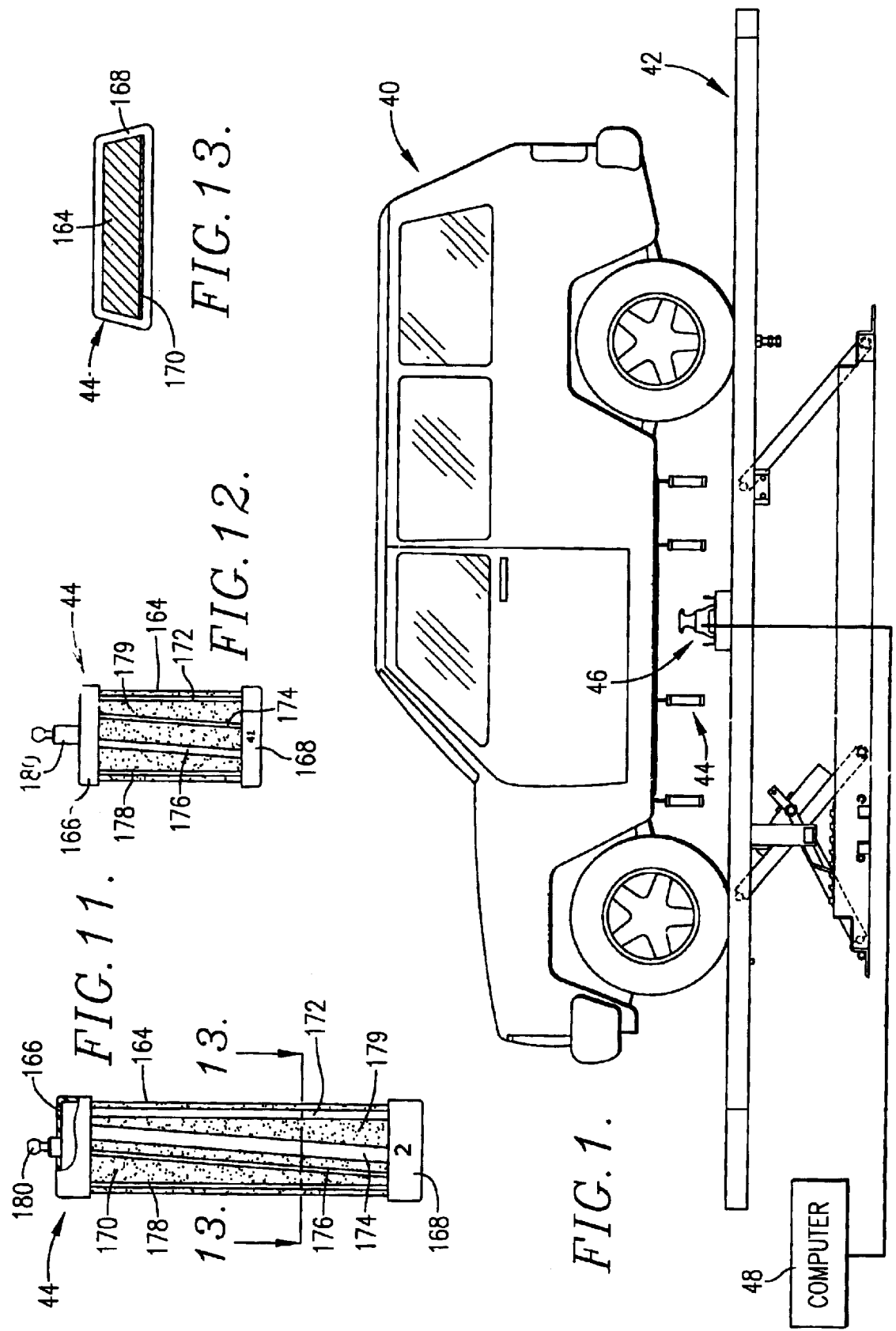

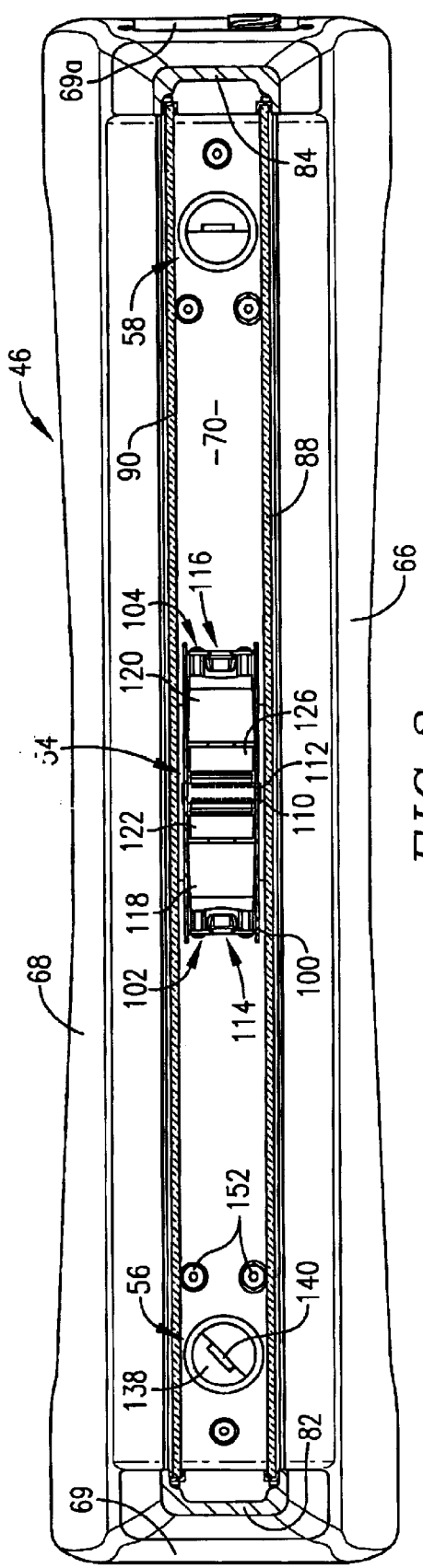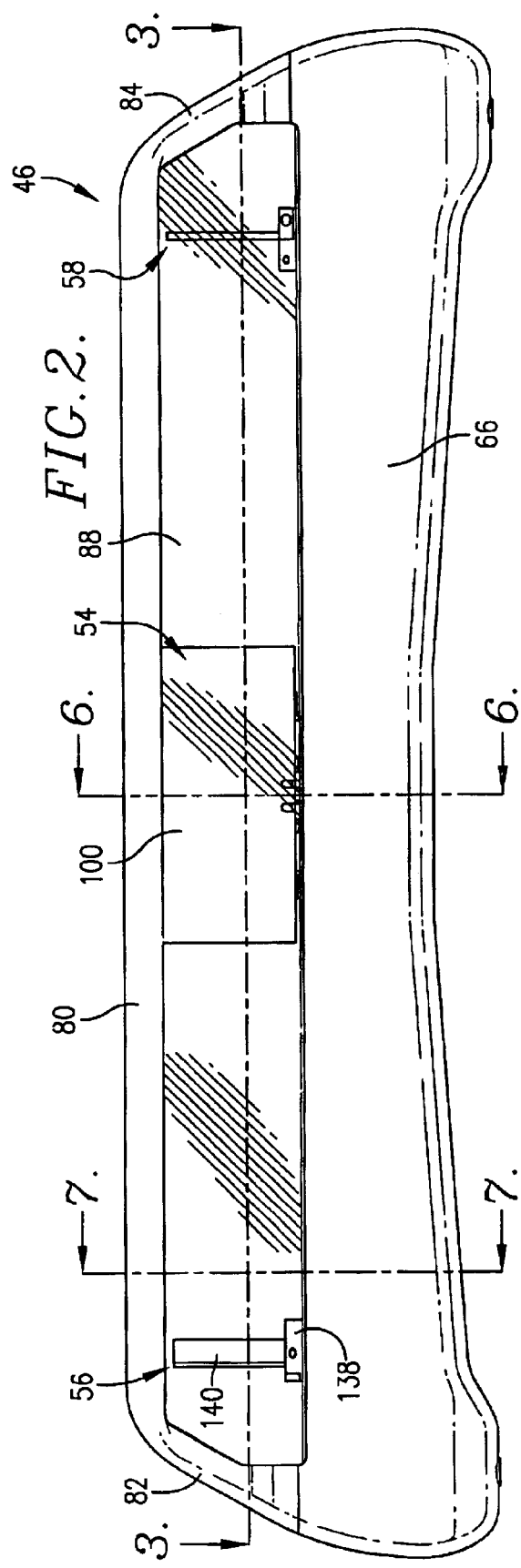
FIG. 3.
FIG. 2.

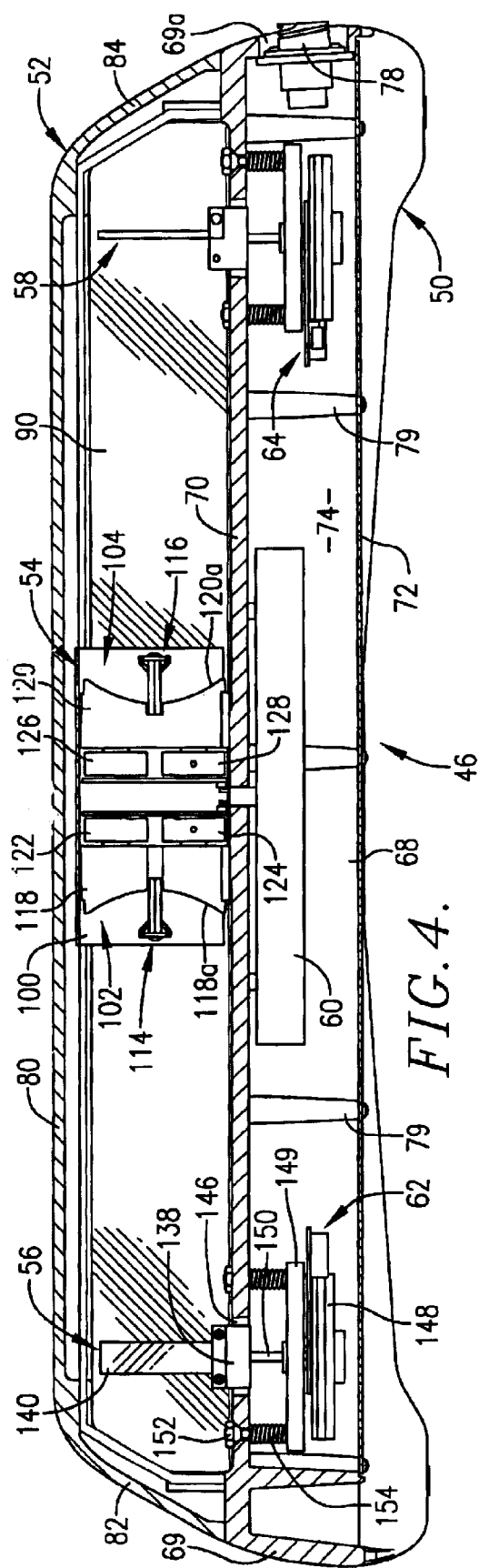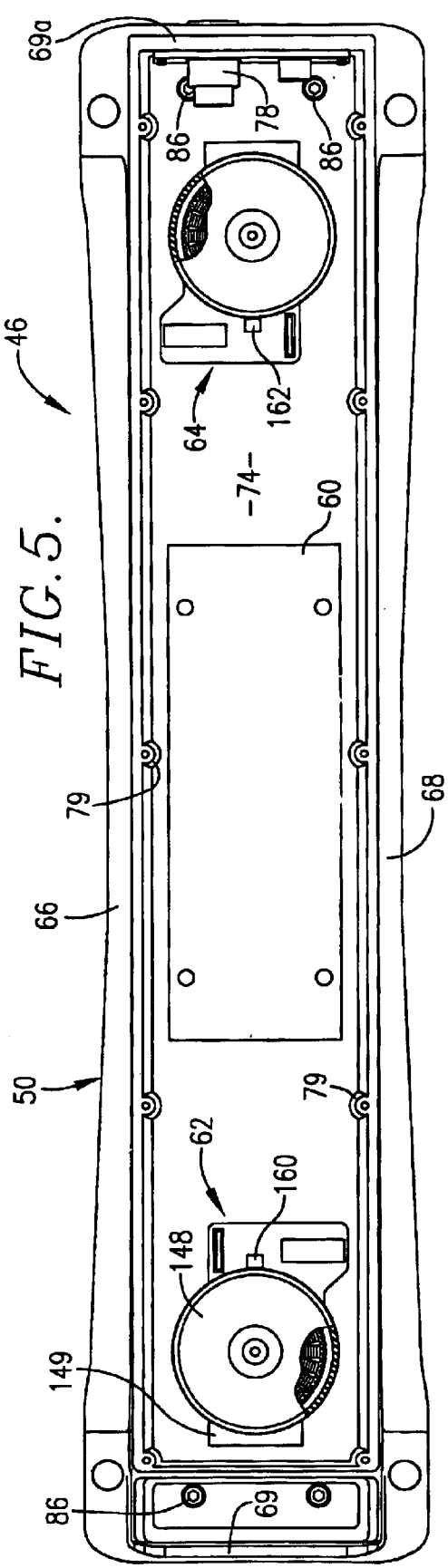

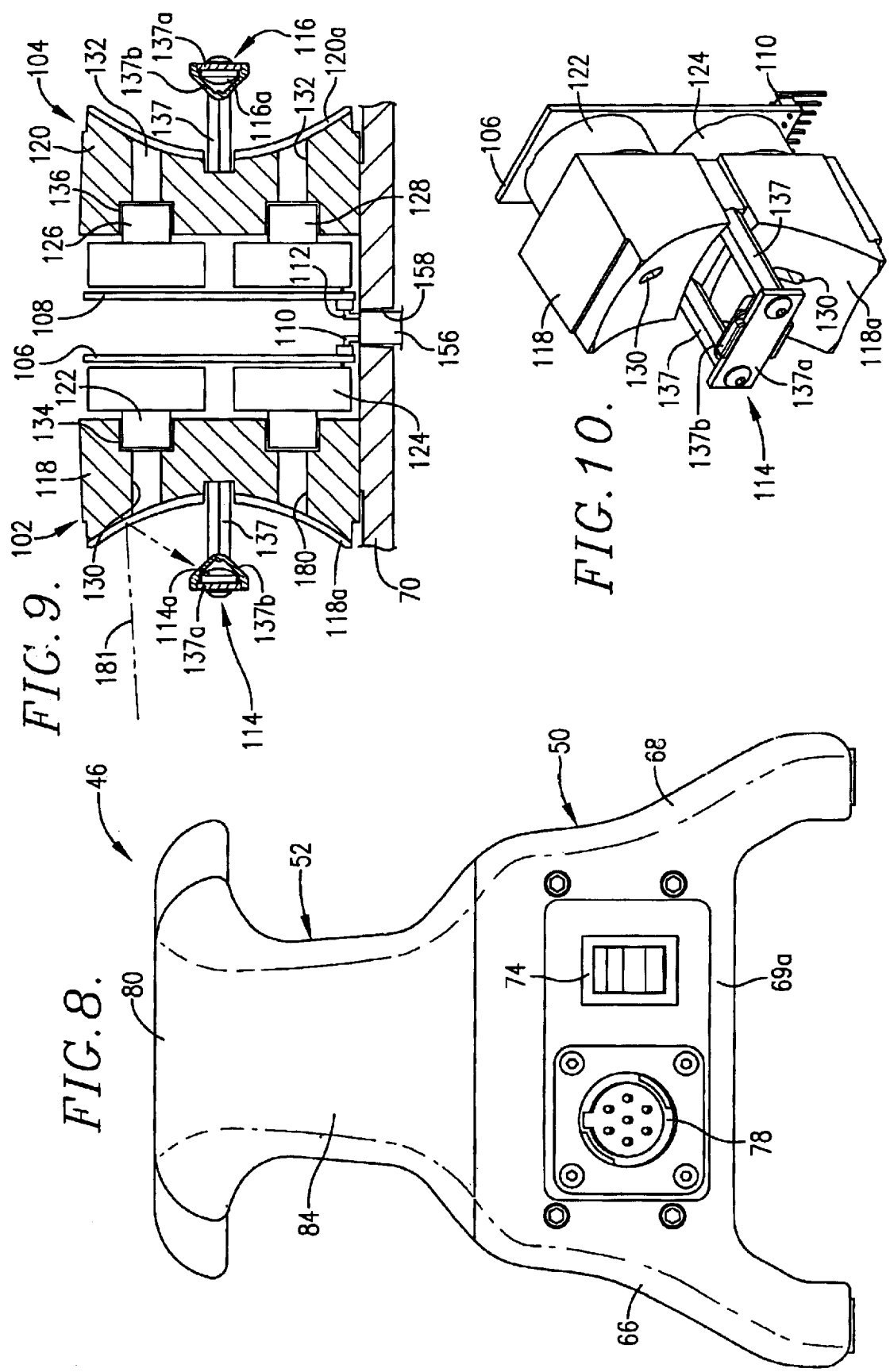

LASER SCANNER WITH PARABOLIC COLLECTOR

COMPUTER PROGRAM LISTING APPENDIX

A computer program listing appendix containing the source code of a computer program that may be used with the present invention is incorporated herein by reference and appended hereto as one (1) original compact disk, and an identical copy thereof, containing a total of 473 files as follows:

| Date of Creation | Size (Bytes) | File Name |
|---|---|---|
| Dec. 10, 2001 | 16,978 | ABOUT~1.CPP |
| Dec. 10, 2001 | 19,800 | ABOUT~1.DFM |
| Dec. 10, 2001 | 5,129 | ABOUT~1.HV |
| Dec. 10, 2001 | 3,349 | ALERTF~1.CPP |
| Dec. 10, 2001 | 21,014 | ALERTF~1.DFM |
| Dec. 10, 2001 | 3,551 | ALERTF~1.HV |
| Dec. 10, 2001 | 5,654 | ALERTL~1.CPP |
| Dec. 10, 2001 | 33,195 | ALERTL~1.DFM |
| Dec. 10, 2001 | 4,220 | ALERTL~1.HV |
| Dec. 10, 2001 | 13,605 | ALLLAN~1.RCV |
| Dec. 10, 2001 | 1,535 | ALLSPE~1.HV |
| Dec. 10, 2001 | 12,028 | ANCHOR~1.CPP |
| Dec. 10, 2001 | 4,968 | ANCHOR~1.HV |
| Dec. 10, 2001 | 15,707 | ASSEMB~1.CPP |
| Dec. 10, 2001 | 57,382 | ASSEMB~1.CPX |
| Dec. 10, 2001 | 4,453 | ASSEMB~1.HV |
| Dec. 10, 2001 | 10,034 | ASSEMB~1.HXV |
| Dec. 10, 2001 | 94,449 | ASSEMB~2.CPP |
| Dec. 10, 2001 | 16,442 | ASSEMB~2.HV |
| Dec. 10, 2001 | 1,845 | ASSEMB~3.HV |
| Dec. 10, 2001 | 21,077 | ATTACH~1.CPP |
| Dec. 10, 2001 | 7,773 | ATTACH~1.HV |
| Dec. 10, 2001 | 3,140 | ATTACH~1.RHV |
| Dec. 10, 2001 | 3,130 | ATTACH~2.HV |
| Dec. 10, 2001 | 2,824 | BALLJO~1.CPP |
| Dec. 10, 2001 | 2,295 | BALLJO~1.HV |
| Dec. 10, 2001 | 1,034 | BITMAP~1.RCV |
| Dec. 10, 2001 | 1,558 | BITMAP~1.RHV |
| Dec. 10, 2001 | 1,410 | BLOB~1.HV |
| Dec. 10, 2001 | 5,273 | BOLTHE~1.CPP |
| Dec. 10, 2001 | 3,130 | BOLTHE~1.HV |
| Dec. 10, 2001 | 3,044 | BOLTHO~1.CPP |
| Dec. 10, 2001 | 2,275 | BOLTHO~1.HV |
| Dec. 10, 2001 | 907 | BUILDD~1.HV |
| Dec. 10, 2001 | 3,998 | BUILDI~1.HV |
| Dec. 10, 2001 | 5,365 | BUILDN~1.HV |
| Dec. 10, 2001 | 882 | CHGATT~1.CUR |
| Dec. 10, 2001 | 1,376 | CHIEF~1.ICO |
| Dec. 10, 2001 | 5,275 | COLORM~1.CPP |
| Dec. 10, 2001 | 2,401 | COLORM~1.HV |
| Dec. 10, 2001 | 28,869 | CONFIG~1.CPP |
| Dec. 10, 2001 | 23,631 | CONFIG~1.HV |
| Dec. 10, 2001 | 3,185 | CURSOR~1.RCV |
| Dec. 10, 2001 | 1,499 | CURSOR~1.RHV |
| Dec. 10, 2001 | 5,527 | DATALO~1.CPP |
| Dec. 10, 2001 | 16,462 | DATALO~1.DFM |
| Dec. 10, 2001 | 4,842 | DATALO~1.HV |
| Dec. 10, 2001 | 5,032 | DATALO~2.HV |
| Dec. 10, 2001 | 1,146 | DEFAUL~1.ICO |
| Dec. 10, 2001 | 3,257 | DEFLEC~1.CPP |
| Dec. 10, 2001 | 2,054 | DEFLEC~1.HV |
| Dec. 10, 2001 | 1,058 | DIMATT~1.HV |
| Dec. 10, 2001 | 57,771 | DIMLAY~1.CPP |
| Dec. 10, 2001 | 49,935 | DIMLAY~1.CPX |
| Dec. 10, 2001 | 9,973 | DIMLAY~1.HV |
| Dec. 10, 2001 | 9,365 | DIMLAY~1.HXV |
| Dec. 10, 2001 | 14,309 | DLLCMD~1.RHV |
| Dec. 10, 2001 | 886 | DLLCUR~1.RHV |
| Dec. 10, 2001 | 2,645 | DLLDEF~1.HV |
| Dec. 10, 2001 | 20,314 | DLLDLG~1.RHV |
| Dec. 10, 2001 | 856 | DLLMEN~1.RHV |
| Dec. 10, 2001 | 6,389 | DLLSTR~1.RHV |
| Dec. 10, 2001 | 31,561 | DSTRIN~1.CPP |
| Dec. 10, 2001 | 15,198 | DYNADI~1.CPP |
| Dec. 10, 2001 | 2,268 | DYNADI~1.HV |
| Dec. 10, 2001 | 7,909 | EAVEHI~1.TLB |
| Dec. 10, 2001 | 3,636 | EDGESP~1.CPP |
| Dec. 10, 2001 | 2,199 | EDGESP~1.HV |
| Dec. 10, 2001 | 12,023 | ENUMTA~1.CPP |
| Dec. 10, 2001 | 3,411 | ENUMTA~1.HV |
| Dec. 10, 2001 | 7,143 | ENUMWO~1.CPP |
| Dec. 10, 2001 | 3,279 | ENUMWO~1.HV |
| Dec. 10, 2001 | 1,585 | ERRENU~1.HV |
| Dec. 10, 2001 | 4,753 | ERRORS~1.HV |
| Dec. 10, 2001 | 1,289 | ESFDAT~1.CPP |
| Dec. 10, 2001 | 172,407 | ESFDAT~1.DFM |
| Dec. 10, 2001 | 1,563 | ESFDAT~1.HV |
| Dec. 10, 2001 | 1,449 | ESFDEF~1.HV |
| Dec. 10, 2001 | 23,781 | ESFEXP~1.CPP |
| Dec. 10, 2001 | 7,095 | ESFEXP~1.HV |
| Dec. 10, 2001 | 1,210 | ESFMSG~1.HV |
| Dec. 10, 2001 | 42,843 | ESF~1.BPR |
| Dec. 10, 2001 | 10,301 | ESF~1.CPP |
| Dec. 10, 2001 | 4,003 | ESF~1.CPX |
| Dec. 10, 2001 | 1,746 | ESF~1.RCV |
| Dec. 10, 2001 | 3,132 | ESTIMA~1.CPP |
| Dec. 10, 2001 | 15,069 | ESTIMA~1.DFM |
| Dec. 10, 2001 | 4,747 | ESTIMA~1.HV |
| Dec. 10, 2001 | 3,164 | ESTNOT~1.CPP |
| Dec. 10, 2001 | 10,117 | ESTNOT~1.DFM |
| Dec. 10, 2001 | 4,239 | ESTNOT~1.HV |
| Dec. 10, 2001 | 9,137 | EXPORT~1.TXT |
| Dec. 10, 2001 | 7,643 | EXT~1.CPP |
| Dec. 10, 2001 | 4,067 | EXT~1.HV |
| Dec. 10, 2001 | 2,955 | FACTOR~1.CPP |
| Dec. 10, 2001 | 2,345 | FACTOR~1.HV |
| Dec. 10, 2001 | 4,411 | FENDER~1.CPP |
| Dec. 10, 2001 | 2,800 | FENDER~1.HV |
| Dec. 10, 2001 | 10,408 | FINDPO~1.CPP |
| Dec. 10, 2001 | 40,125 | FINDPO~1.DFM |
| Dec. 10, 2001 | 4,302 | FINDPO~1.HV |
| Dec. 10, 2001 | 4,704 | FIXTUR~1.CPP |
| Dec. 10, 2001 | 2,848 | FIXTUR~1.HV |
| Dec. 10, 2001 | 2,637 | FLANGE~1.CPP |
| Dec. 10, 2001 | 2,243 | FLANGE~1.HV |
| Dec. 10, 2001 | 6,328 | FRAME~1.CPP |
| Dec. 10, 2001 | 3,785 | FRAME~1.HV |
| Dec. 10, 2001 | 885 | FREEZE~1.CUR |
| Dec. 10, 2001 | 8,459 | GARC~1.CPP |
| Dec. 10, 2001 | 3,723 | GARC~1.HV |
| Dec. 10, 2001 | 4,424 | GATTRI~1.CPP |
| Dec. 10, 2001 | 2,869 | GATTRI~1.HV |
| Dec. 10, 2001 | 5,252 | GBLOCK~1.CPP |
| Dec. 10, 2001 | 3,774 | GBLOCK~1.HV |
| Dec. 10, 2001 | 3,325 | GCIRCL~1.CPP |
| Dec. 10, 2001 | 2,311 | GCIRCL~1.HV |
| Dec. 10, 2001 | 23,932 | GDIALO~1.CPP |
| Dec. 10, 2001 | 3,148 | GDIALO~1.DFM |
| Dec. 10, 2001 | 2,876 | GDIALO~1.HV |
| Dec. 10, 2001 | 16,110 | GENCD~1.CPP |
| Dec. 10, 2001 | 2,126 | GENCD~1.HV |
| Dec. 10, 2001 | 15,801 | GENCLI~1.BPR |
| Dec. 10, 2001 | 4,816 | GENCLI~1.CPP |
| Dec. 10, 2001 | 978,163 | GENCLI~1.DFM |
| Jul. 31, 2001 | 5,960 | GENCLI~1.DSK |
| Dec. 10, 2001 | 13,351 | GENCLI~1.HV |
| Dec. 10, 2001 | 5,395 | GENCLI~1.RCV |
| Dec. 10, 2001 | 3,976 | GENCLI~1.RHV |
| Dec. 10, 2001 | 65,406 | GENCLI~2.BPR |
| Dec. 10, 2001 | 12,950 | GENCLI~2.CPP |
| Dec. 10, 2001 | 313,467 | GENCLI~2.DFM |
| Dec. 10, 2001 | 1,599 | GENCLI~2.HV |
| Dec. 10, 2001 | 1,317 | GENCLI~3.CPP |
| Dec. 10, 2001 | 81,850 | GENCLI~4.CPP |
| Dec. 10, 2001 | 1,338 | GENDEB~1.HV |
| Dec. 10, 2001 | 2,212 | GENDIA~1.RHV |
| Dec. 10, 2001 | 46,616 | GENERA~1.CPP |
| Dec. 10, 2001 | 6,000 | GENERA~1.HV |
| Dec. 10, 2001 | 17,734 | GENESI~1.CPP |

-continued

| Date of Creation | Size (Bytes) | File Name |
|---|---|---|
| Dec. 10, 2001 | 4,141 | GENESI~1.HV |
| Dec. 10, 2001 | 1,146 | GENESI~1.ICO |
| Dec. 20, 2001 | 1,720,807 | GENESI~1.ZIP |
| Dec. 10, 2001 | 3,103 | GENFON~1.CPP |
| Dec. 10, 2001 | 2,562 | GENFON~1.HV |
| Dec. 10, 2001 | 12,713 | GENLAN~1.CPP |
| Dec. 10, 2001 | 3,284 | GENLAN~1.HV |
| Dec. 10, 2001 | 2,701 | GENLAN~1.RCV |
| Dec. 10, 2001 | 78,029 | GENPRE~1.CPP |
| Dec. 10, 2001 | 161,048 | GENPRE~1.DFM |
| Dec. 10, 2001 | 13,858 | GENPRE~1.HV |
| Dec. 10, 2001 | 26,933 | GENPRE~2.CPP |
| Dec. 10, 2001 | 9,017 | GENPRE~2.HV |
| Dec. 10, 2001 | 120,327 | GENREG~1.CPP |
| Dec. 10, 2001 | 27,352 | GENREG~1.HV |
| Dec. 10, 2001 | 21,159 | GENRES~1.BPR |
| Dec. 10, 2001 | 13,963 | GENRES~1.CPP |
| Dec. 10, 2001 | 1,925 | GENRES~1.RCV |
| Dec. 10, 2001 | 79,115 | GENSER~1.BPR |
| Dec. 10, 2001 | 21,141 | GENSER~1.CPP |
| Dec. 10, 2001 | 20,323 | GENSER~1.DFM |
| Dec. 10, 2001 | 1,445 | GENSER~1.HV |
| Dec. 10, 2001 | 12,273 | GENSER~1.IDL |
| Dec. 10, 2001 | 1,805 | GENSER~1.RCV |
| Dec. 10, 2001 | 3,347 | GENSER~1.RHV |
| Dec. 10, 2001 | 74,033 | GENSER~1.TLB |
| Dec. 10, 2001 | 1,267 | GENSER~2.CPP |
| Dec. 10, 2001 | 1,313,086 | GENSER~2.DFM |
| Dec. 10, 2001 | 139,157 | GENSER~2.HV |
| Dec. 10, 2001 | 9,179 | GENSER~3.CPP |
| Dec. 10, 2001 | 1,599 | GENSER~3.HV |
| Dec. 10, 2001 | 1,313 | GENSER~4.CPP |
| Dec. 10, 2001 | 22,937 | GENSER~4.HV |
| Dec. 10, 2001 | 174,323 | GENSER~5.CPP |
| Dec. 10, 2001 | 1,269 | GENSHA~1.HV |
| Dec. 10, 2001 | 4,169 | GENSTA~1.RHV |
| Dec. 10, 2001 | 84,265 | GENSTR~1.RCV |
| Dec. 10, 2001 | 8,804 | GENSTR~1.RHV |
| Dec. 10, 2001 | 14,262 | GENVER~1.RCV |
| Dec. 10, 2001 | 86,083 | GENXPR~1.CPP |
| Dec. 10, 2001 | 9,272 | GENXPR~1.HV |
| Dec. 10, 2001 | 3,506 | GFILL~1.CPP |
| Dec. 10, 2001 | 2,373 | GFILL~1.HV |
| Dec. 10, 2001 | 7,781 | GGRAPH~1.CPP |
| Dec. 10, 2001 | 3,518 | GGRAPH~1.HV |
| Dec. 10, 2001 | 3,800 | GINSER~1.CPP |
| Dec. 10, 2001 | 2,610 | GINSER~1.HV |
| Dec. 10, 2001 | 14,282 | GLAYER~1.CPP |
| Dec. 10, 2001 | 5,266 | GLAYER~1.HV |
| Dec. 10, 2001 | 2,859 | GLINE~1.CPP |
| Dec. 10, 2001 | 2,390 | GLINE~1.HV |
| Dec. 10, 2001 | 3,415 | GPATH~1.CPP |
| Dec. 10, 2001 | 2,641 | GPATH~1.HV |
| Dec. 10, 2001 | 3,700 | GPOINT~1.CPP |
| Dec. 10, 2001 | 2,514 | GPOINT~1.HV |
| Dec. 10, 2001 | 5,979 | GPOLYA~1.CPP |
| Dec. 10, 2001 | 3,120 | GPOLYA~1.HV |
| Dec. 10, 2001 | 1,925 | GPOLYF~1.CPP |
| Dec. 10, 2001 | 2,017 | GPOLYF~1.HV |
| Dec. 10, 2001 | 2,820 | GPOLYL~1.CPP |
| Dec. 10, 2001 | 2,401 | GPOLYL~1.HV |
| Dec. 10, 2001 | 1,903 | GPOLYO~1.CPP |
| Dec. 10, 2001 | 1,985 | GPOLYO~1.HV |
| Dec. 10, 2001 | 6,266 | GPOLYS~1.CPP |
| Dec. 10, 2001 | 2,859 | GPOLYS~1.HV |
| Dec. 10, 2001 | 3,401 | GRECT~1.CPP |
| Dec. 10, 2001 | 2,340 | GRECT~1.HV |
| Dec. 10, 2001 | 2,434 | GRTYPE~1.HV |
| Dec. 10, 2001 | 6,421 | GSCALE~1.CPP |
| Dec. 10, 2001 | 2,542 | GSCALE~1.HV |
| Dec. 10, 2001 | 3,297 | GSOLID~1.CPP |
| Dec. 10, 2001 | 2,404 | GSOLID~1.HV |
| Dec. 10, 2001 | 5,928 | GSPECD~1.CPP |
| Dec. 10, 2001 | 3,123 | GSPECD~1.HV |
| Dec. 10, 2001 | 13,739 | GSPECL~1.CPP |
| Dec. 10, 2001 | 5,991 | GSPECL~1.HV |
| Dec. 10, 2001 | 57,571 | GSPECM~1.CPP |

-continued

| Date of Creation | Size (Bytes) | File Name |
|---|---|---|
| Dec. 10, 2001 | 12,322 | GSPECM~1.HV |
| Dec. 10, 2001 | 68,054 | GSPECP~1.CPP |
| Dec. 10, 2001 | 11,345 | GSPECP~1.HV |
| Dec. 10, 2001 | 13,815 | GSPECS~1.CPP |
| Dec. 10, 2001 | 16,146 | GSPECS~1.HV |
| Dec. 10, 2001 | 126,324 | GSPEC~1.CPP |
| Dec. 10, 2001 | 96,759 | GSPEC~1.CPX |
| Dec. 10, 2001 | 30,617 | GSPEC~1.HV |
| Dec. 10, 2001 | 20,636 | GSPEC~1.HXV |
| Dec. 10, 2001 | 49,867 | GTARGE~1.CPP |
| Dec. 10, 2001 | 19,796 | GTARGE~1.HV |
| Dec. 10, 2001 | 6,910 | GTARGE~2.CPP |
| Dec. 10, 2001 | 3,835 | GTARGE~2.HV |
| Dec. 10, 2001 | 4,980 | GTEXT~1.CPP |
| Dec. 10, 2001 | 2,676 | GTEXT~1.HV |
| Dec. 10, 2001 | 6,065 | GTYPE~1.CPP |
| Dec. 10, 2001 | 5,201 | GTYPE~1.HV |
| Dec. 10, 2001 | 10,566 | GVEHIC~1.CPP |
| Dec. 10, 2001 | 2,341 | GVEHIC~1.HV |
| Dec. 10, 2001 | 25,287 | GVSPEC~1.CPP |
| Dec. 10, 2001 | 6,241 | GVSPEC~1.HV |
| Dec. 10, 2001 | 3,276 | HISTOR~1.CPP |
| Dec. 10, 2001 | 3,292 | HISTOR~1.HV |
| Dec. 10, 2001 | 7,937 | HOLESP~1.CPP |
| Dec. 10, 2001 | 2,998 | HOLESP~1.HV |
| Dec. 10, 2001 | 5,498 | HOOD~1.CPP |
| Dec. 10, 2001 | 3,387 | HOOD~1.HV |
| Dec. 10, 2001 | 1,065 | HUBLOG~1.CPP |
| Dec. 10, 2001 | 2,180 | HUBLOG~1.HV |
| Dec. 10, 2001 | 91,200 | HUB~1.CPP |
| Dec. 10, 2001 | 25,775 | HUB~1.HV |
| Dec. 10, 2001 | 1,515 | ICONID~1.RHV |
| Dec. 10, 2001 | 874 | ICONS~1.RCV |
| Dec. 10, 2001 | 6,169 | IFNULL~1.CPP |
| Dec. 10, 2001 | 4,561 | IFNULL~1.HV |
| Dec. 10, 2001 | 7,243 | INSPNO~1.CPP |
| Dec. 10, 2001 | 12,524 | INSPNO~1.DFM |
| Dec. 10, 2001 | 4,618 | INSPNO~1.HV |
| Dec. 10, 2001 | 87,420 | LANGMG~1.CPP |
| Dec. 10, 2001 | 9,755 | LANGMG~1.HV |
| Dec. 10, 2001 | 38,876 | LANGUA~1.RHV |
| Dec. 10, 2001 | 1,071 | LASTER~1.HV |
| Dec. 10, 2001 | 8,547 | LEGEND~1.CPP |
| Dec. 10, 2001 | 2,804 | LEGEND~1.HV |
| Dec. 10, 2001 | 17,067 | LIVETA~1.CPP |
| Dec. 10, 2001 | 12,109 | LIVETA~1.HV |
| Dec. 10, 2001 | 17,477 | LIVETA~2.CPP |
| Dec. 10, 2001 | 6,122 | LIVETA~2.HV |
| Dec. 10, 2001 | 3,366 | MADETA~1.CPP |
| Dec. 10, 2001 | 4,835 | MADETA~1.DFM |
| Dec. 10, 2001 | 1,978 | MADETA~1.HV |
| Dec. 10, 2001 | 882 | MAKEPN~1.CUR |
| Dec. 10, 2001 | 2,271 | MEASUR~1.HV |
| Dec. 10, 2001 | 8,349 | MESSAG~1.RHV |
| Dec. 10, 2001 | 6,897 | MOREDE~1.RHV |
| Dec. 10, 2001 | 3,809 | MOREOW~1.HV |
| Dec. 10, 2001 | 1,798 | MOUSEO~1.HV |
| Dec. 10, 2001 | 882 | MOVETA~1.CUR |
| Dec. 10, 2001 | 2,379 | MSGDLG~1.HV |
| Dec. 10, 2001 | 8,137 | NOSPEC~1.CPP |
| Dec. 10, 2001 | 898,862 | NOSPEC~1.DFM |
| Dec. 10, 2001 | 5,087 | NOSPEC~1.HV |
| Dec. 10, 2001 | 801 | NOTES~1.RHV |
| Dec. 10, 2001 | 5,605 | OVALHO~1.CPP |
| Dec. 10, 2001 | 3,080 | OVALHO~1.HV |
| Dec. 10, 2001 | 15,847 | PARKFI~1.CPP |
| Dec. 10, 2001 | 8,555 | PARKFI~1.HV |
| Dec. 10, 2001 | 2,072 | PARTID~1.CPP |
| Dec. 10, 2001 | 4,400 | PARTID~1.HV |
| Dec. 10, 2001 | 7,242 | PARTSB~1.CPP |
| Dec. 10, 2001 | 54,922 | PARTSB~1.DFM |
| Dec. 10, 2001 | 3,142 | PARTSB~1.HV |
| Dec. 10, 2001 | 2,706 | PINCHW~1.CPP |
| Dec. 10, 2001 | 2,291 | PINCHW~1.HV |
| Dec. 10, 2001 | 5,619 | POINT~1.CPP |
| Dec. 10, 2001 | 4,461 | POINT~1.HV |
| Dec. 10, 2001 | 1,931 | PROGRE~1.CPP |

-continued

| Date of Creation | Size (Bytes) | File Name |
|---|---|---|
| Dec. 10, 2001 | 4,176 | PROGRE~1.DFM |
| Dec. 10, 2001 | 2,216 | PROGRE~1.HV |
| Dec. 10, 2001 | 6,351 | PROTRU~1.CPP |
| Dec. 10, 2001 | 2,908 | PROTRU~1.HV |
| Dec. 10, 2001 | 5,737 | QUICKO~1.CPP |
| Dec. 10, 2001 | 13,726 | QUICKO~1.DFM |
| Dec. 10, 2001 | 4,132 | QUICKO~1.HV |
| Dec. 10, 2001 | 2,594 | RAIL~1.CPP |
| Dec. 10, 2001 | 2,211 | RAIL~1.HV |
| Dec. 10, 2001 | 3,141 | RAWSOU~1.HV |
| Dec. 10, 2001 | 4,428 | READTH~1.CPP |
| Dec. 10, 2001 | 2,180 | READTH~1.HV |
| Dec. 10, 2001 | 3,829 | REGIDT~1.HV |
| Dec. 10, 2001 | 15,004 | REINIT~1.CPP |
| Dec. 10, 2001 | 2,960 | REINIT~1.HV |
| Dec. 10, 2001 | 5,548 | RESULT~1.CPP |
| Dec. 10, 2001 | 8,511 | RESULT~1.DFM |
| Dec. 10, 2001 | 3,115 | RESULT~1.HV |
| Dec. 10, 2001 | 2,755 | RIVET~1.CPP |
| Dec. 10, 2001 | 2,231 | RIVET~1.HV |
| Dec. 10, 2001 | 4,645 | RODLEN~1.CPP |
| Dec. 10, 2001 | 2,468 | RODLEN~1.HV |
| Dec. 10, 2001 | 2,325 | RODLEN~2.CPP |
| Dec. 10, 2001 | 2,087 | RODLEN~2.HV |
| Dec. 10, 2001 | 3,431 | ROTACC~1.HV |
| Dec. 10, 2001 | 67,601 | SCANDR~1.BPR |
| Dec. 10, 2001 | 12,924 | SCANDR~1.CPP |
| Dec. 10, 2001 | 1,781 | SCANDR~1.RCV |
| Dec. 10, 2001 | 1,579 | SCANDR~1.RHV |
| Dec. 10, 2001 | 19,531 | SCANER~1.CPP |
| Dec. 10, 2001 | 3,713 | SCANER~1.HV |
| Dec. 10, 2001 | 145,834 | SCANNE~1.CPP |
| Dec. 10, 2001 | 123,954 | SCANNE~1.DFM |
| Dec. 10, 2001 | 25,082 | SCANNE~1.HV |
| Dec. 10, 2001 | 1,376 | SCANNE~1.ICO |
| Dec. 10, 2001 | 8,329 | SCANNE~1.RHV |
| Dec. 10, 2001 | 71,826 | SCANNE~2.CPP |
| Dec. 10, 2001 | 2,259 | SCANNE~2.DFM |
| Dec. 10, 2001 | 1,379 | SCANNE~2.HV |
| Dec. 10, 2001 | 60,693 | SCANNE~3.CPP |
| Dec. 10, 2001 | 10,384 | SCANNE~3.DFM |
| Dec. 10, 2001 | 16,786 | SCANNE~3.HV |
| Dec. 10, 2001 | 32,240 | SCANNE~4.CPP |
| Dec. 10, 2001 | 8,748 | SCANNE~4.HV |
| Dec. 10, 2001 | 149,473 | SCANNE~5.CPP |
| Dec. 10, 2001 | 18,516 | SCANNE~5.HV |
| Dec. 10, 2001 | 28,770 | SCANNE~6.HV |
| Dec. 10, 2001 | 16,663 | SCANSE~1.CPP |
| Dec. 10, 2001 | 62,975 | SCANSE~1.DFM |
| Dec. 10, 2001 | 3,439 | SCANSE~1.HV |
| Dec. 10, 2001 | 4,507 | SCANSE~1.IDL |
| Dec. 10, 2001 | 5,892 | SCANST~1.CPP |
| Dec. 10, 2001 | 42,261 | SCANST~1.DFM |
| Dec. 10, 2001 | 3,384 | SCANST~1.HV |
| Dec. 10, 2001 | 1,537 | SCANST~2.HV |
| Dec. 10, 2001 | 5,781 | SCANTH~1.CPP |
| Dec. 10, 2001 | 3,141 | SCANTH~1.HV |
| Dec. 10, 2001 | 46,940 | SCANVI~1.CPP |
| Dec. 10, 2001 | 120,341 | SCANVI~1.DFM |
| Dec. 10, 2001 | 8,531 | SCANVI~1.HV |
| Dec. 10, 2001 | 15,449 | SCAN~1.CPP |
| Dec. 10, 2001 | 3,045 | SCAN~1.HV |
| Dec. 10, 2001 | 7,442 | SEARCH~1.CPP |
| Dec. 10, 2001 | 33,426 | SEARCH~1.DFM |
| Dec. 10, 2001 | 3,948 | SEARCH~1.HV |
| Dec. 10, 2001 | 11,633 | SELECT~1.CPP |
| Dec. 10, 2001 | 51,820 | SELECT~1.DFM |
| Dec. 10, 2001 | 3,964 | SELECT~1.HV |
| Jun. 04, 2001 | 6,506 | SELECT~2.DFM |
| Dec. 10, 2001 | 15,969 | SERIAL~1.CPP |
| Dec. 10, 2001 | 5,636 | SERIAL~1.HV |
| Dec. 10, 2001 | 12,251 | SHARED~1.CPP |
| Dec. 10, 2001 | 3,795 | SHARED~1.HV |
| Dec. 10, 2001 | 1,965 | SHARED~1.RHV |
| Dec. 10, 2001 | 24,538 | SHOPIN~1.CPP |
| Dec. 10, 2001 | 3,904 | SHOPIN~1.HV |
| Dec. 10, 2001 | 11,916 | SHOPMA~1.CPP |

-continued

| Date of Creation | Size (Bytes) | File Name |
|---|---|---|
| Dec. 10, 2001 | 3,620 | SHOPMA~1.HV |
| Dec. 10, 2001 | 9,942 | SHOWDB~1.CPP |
| Dec. 10, 2001 | 5,530 | SHOWDB~1.HV |
| Dec. 10, 2001 | 3,516 | SPECOP~1.HV |
| Dec. 10, 2001 | 1,747 | SPECTY~1.HV |
| Dec. 10, 2001 | 13,110 | SSRESU~1.CPP |
| Dec. 10, 2001 | 9,690 | SSRESU~1.DFM |
| Dec. 10, 2001 | 5,500 | SSRESU~1.HV |
| Dec. 10, 2001 | 24,001 | STOCKS~1.CPP |
| Dec. 10, 2001 | 3,560 | STOCKS~1.HV |
| Dec. 10, 2001 | 5,135 | STREAM~1.CPP |
| Dec. 10, 2001 | 3,647 | STREAM~1.HV |
| Dec. 10, 2001 | 6,011 | STRUTB~1.CPP |
| Dec. 10, 2001 | 2,946 | STRUTB~1.HV |
| Dec. 10, 2001 | 5,913 | STRUTS~1.CPP |
| Dec. 10, 2001 | 2,946 | STRUTS~1.HV |
| Dec. 10, 2001 | 4,791 | STUD~1.CPP |
| Dec. 10, 2001 | 2,851 | STUD~1.HV |
| Dec. 10, 2001 | 883 | TAE30B~1.CUR |
| Dec. 10, 2001 | 883 | TAE30E~1.CUR |
| Dec. 10, 2001 | 883 | TAE311~1.CUR |
| Dec. 10, 2001 | 883 | TAE314~1.CUR |
| Dec. 10, 2001 | 883 | TAE316~1.CUR |
| Dec. 10, 2001 | 883 | TAE319~1.CUR |
| Dec. 10, 2001 | 883 | TAE31C~1.CUR |
| Dec. 10, 2001 | 883 | TAE31E~1.CUR |
| Dec. 10, 2001 | 883 | TAE321~1.CUR |
| Dec. 10, 2001 | 883 | TAE323~1.CUR |
| Dec. 10, 2001 | 883 | TAE325~1.CUR |
| Dec. 10, 2001 | 884 | TAE337~1.CUR |
| Dec. 10, 2001 | 884 | TAE33A~1.CUR |
| Dec. 10, 2001 | 884 | TAE33C~1.CUR |
| Dec. 10, 2001 | 884 | TAE33E~1.CUR |
| Dec. 10, 2001 | 884 | TAE340~1.CUR |
| Dec. 10, 2001 | 884 | TAE343~1.CUR |
| Dec. 10, 2001 | 884 | TAE345~1.CUR |
| Dec. 10, 2001 | 884 | TAE347~1.CUR |
| Dec. 10, 2001 | 884 | TAE34A~1.CUR |
| Dec. 10, 2001 | 884 | TAE34C~1.CUR |
| Dec. 10, 2001 | 883 | TAE34E~1.CUR |
| Dec. 10, 2001 | 883 | TAE351~1.CUR |
| Dec. 10, 2001 | 883 | TAE353~1.CUR |
| Dec. 10, 2001 | 883 | TAE355~1.CUR |
| Dec. 10, 2001 | 883 | TAE358~1.CUR |
| Dec. 10, 2001 | 883 | TAE35A~1.CUR |
| Dec. 10, 2001 | 883 | TAE35C~1.CUR |
| Dec. 10, 2001 | 883 | TAE35F~1.CUR |
| Dec. 10, 2001 | 883 | TAE362~1.CUR |
| Dec. 10, 2001 | 883 | TAE364~1.CUR |
| Dec. 10, 2001 | 884 | TAE366~1.CUR |
| Dec. 10, 2001 | 884 | TAE369~1.CUR |
| Dec. 10, 2001 | 884 | TAE36B~1.CUR |
| Dec. 10, 2001 | 884 | TAE36E~1.CUR |
| Dec. 10, 2001 | 884 | TAE370~1.CUR |
| Dec. 10, 2001 | 884 | TAE373~1.CUR |
| Dec. 10, 2001 | 1,586 | TARGDE~1.HV |
| Dec. 10, 2001 | 8,643 | TARGET~1.CPP |
| Dec. 10, 2001 | 883 | TARGET~1.CUR |
| Dec. 10, 2001 | 15,946 | TARGET~1.HV |
| Dec. 10, 2001 | 883 | TARGET~2.CUR |
| Dec. 10, 2001 | 883 | TARGET~3.CUR |
| Dec. 10, 2001 | 883 | TARGET~4.CUR |
| Dec. 10, 2001 | 883 | TARGET~5.CUR |
| Dec. 10, 2001 | 883 | TARGET~6.CUR |
| Dec. 10, 2001 | 883 | TARGET~7.CUR |
| Dec. 10, 2001 | 883 | TARGET~8.CUR |
| Dec. 10, 2001 | 883 | TARGET~9.CUR |
| Dec. 10, 2001 | 20,201 | TASK~1.CPP |
| Dec. 10, 2001 | 4,252 | TASK~1.HV |
| Jun. 04, 2001 | 5,654 | TEST.BMP |
| Dec. 10, 2001 | 6,378 | TEST~1.BMP |
| Dec. 10, 2001 | 884 | THAW~1.CUR |
| Dec. 10, 2001 | 2,892 | TRANSL~1.CPP |
| Dec. 10, 2001 | 13,116 | TRANSL~1.DFM |
| Dec. 10, 2001 | 3,773 | TRANSL~1.HV |
| Dec. 10, 2001 | 882 | TRASHC~1.CUR |
| Dec. 10, 2001 | 15,770 | UMSATT~1.CPP |

-continued

| Date of Creation | Size (Bytes) | File Name |
|---|---|---|
| Dec. 10, 2001 | 9,333 | UMSATT~1.HV |
| Dec. 10, 2001 | 84,911 | UMSDAT~1.CPP |
| Dec. 10, 2001 | 13,678 | UMSDAT~1.HV |
| Dec. 10, 2001 | 1,547 | UMSINF~1.HV |
| Dec. 10, 2001 | 16,588 | UTILEX~1.CPP |
| Dec. 10, 2001 | 2,877 | UTILEX~1.HV |
| Dec. 10, 2001 | 3,469 | UTILEX~2.HV |
| Dec. 10, 2001 | 36,631 | UTILIT~1.BPR |
| Dec. 10, 2001 | 13,946 | UTILIT~1.CPP |
| Dec. 10, 2001 | 1,776 | UTILIT~1.RCV |
| Dec. 10, 2001 | 2,254 | UTILIT~1.RHV |
| Dec. 10, 2001 | 18,851 | VECT3D~1.CPP |
| Dec. 10, 2001 | 14,782 | VECT3D~1.HV |
| Dec. 10, 2001 | 11,310 | VEHICL~1.CPP |
| Dec. 10, 2001 | 3,061 | VEHICL~1.HV |
| Dec. 10, 2001 | 2,718 | VHCLLI~1.CPP |
| Dec. 10, 2001 | 1,405 | VHCLLI~1.HV |
| Dec. 10, 2001 | 1,634 | VIDEOC~1.BMP |
| Dec. 10, 2001 | 30,142 | WORKOR~1.CPP |
| Dec. 10, 2001 | 5,010 | WORKOR~1.HV |
| Dec. 10, 2001 | 7,397 | XGEOME~1.CPP |
| Dec. 10, 2001 | 46,547 | XGEOME~1.HV |
| Dec. 10, 2001 | 2,388 | XLIST~1.HV |
| Dec. 10, 2001 | 673 | ZOOMMI~1.CUR |
| Dec. 10, 2001 | 673 | ZOOMPL~1.CUR |
| Dec. 10, 2001 | 885 | ZOOM~1.CUR |

BACKGROUND OF THE INVENTION

1. Field of the Invention

The present invention is broadly concerned with apparatus for determining deformation in vehicle bodies and the like, using a laser scanning apparatus in conjunction with a plurality of coded targets suspended from (or in known relationship to) known reference points on the vehicle to calculate three dimensional spatial coordinates defining the actual positions of the targets, and to compare such calculated positions with manufacturer-provided specification values. More particularly, the invention is concerned with such apparatus and corresponding methods wherein use is made of a stationary central laser assembly including respective emitter lasers and corresponding parabolic collectors and associated detectors, a pair of upright, rotatable mirrors, and on-board scanner electronics all located within an enclosed housing.

Use of parabolic collectors has been found to enhance the detected signal strength, thus permitting more accurate vehicle repair.

2. Description of the Prior Art

In the past, vehicles such as automobiles have structural frames on which body panels and the like were built. Repair of accidental vehicle damage often involved straightening the frame and reshaping or replacing body panels. In order to meet government-imposed fuel consumption standards, unibody construction was adopted for many vehicles. In a unibody vehicle, no distinct frame exists apart from the body panels; instead, like an egg carton, the panels together form a "unibody", with consequence substantial weight savings.

With either form of vehicle, frame or unibody, repair is greatly speeded with improved quality, by use of a frame (and unibody) straightening machine such as described in U.S. Pat. No. RE 31,636. While such straightening machines are highly effective, such machines do not by themselves provide information as to the extent of straightening to be accomplished. Vehicles currently have manufacturer-provided reference points, such as reference openings or holes located at established points on the vehicles. Manufacturers also provide specifications for the correct three-dimensional spatial locations of these reference points relative to each other. Thus, if a vehicle is damaged, these reference points may be moved from their normal or "specification" positions with respect to each other. Most, if not all, vehicle frame and unibody straightening jobs require return of the vehicle reference points to within manufacturer specifications.

U.S. Pat. No. 5,801,834 describes a significant advance in the vehicle straightening art, and apparatus in accordance therewith has been commercialized by Chief Automotive Systems of Grand Island, Nebr. Specifically, this patent discloses a laser generating unit located beneath a vehicle and in an orientation for sweeping laser beams across the reflective surfaces of coded targets suspended from or in known relationship to the vehicle reference points. Preferably, a laser beam is split into two beams using a 50/50 beam splitter, with each beam then being directed to a rotating mirror. The rotating mirrors direct the laser beams in a 360° circle, with both beams being directed in a single plane. Each laser beam is reflected back to its source when it strikes the reflective stripes of the coded targets. These reflected beams are registered as "on" events (or counts) by the electronics onboard the laser measuring device. A counter counts the number of counts (as measured by an oscillator) from zero to the edge of each reflective/non-reflective border on the targets. An associated microprocessor receives the count information for each target and computes the angle from the center of each mirror to the center of each target. With the two angle measurements (one for each mirror and target) and the known baseline between the two mirrors, the planar (X, Y) coordinates of each reference hole are computed using trigonometry. The third coordinate (Z) is calculated using Z-coordinate representative sizing of the reflective and non-reflective strips on the coded targets. The actual three-dimensional spatial coordinates of each reference hole relative to a calculated point and plane are determined and displayed by the computer, along with the deviation from the normal or specification value provided by the vehicle manufacturer's data. With this information, the operator may then straighten the frame or unibody, with successive measurements being taken to monitor the progress of the straightening operation and determination of when the frame or unibody is properly straightened.

It will be appreciated that the system described in the '834 patent assumes that all of the vehicle targets will be essentially in plumb. However, in practice this is not always the case. For example, targets may not assume a plumb orientation owing to interference between the targets and vehicle components, particularly with damaged vehicles. Furthermore, many straightening shops are operated in open air so that the cantilever-suspended targets are subject to wind-induced oscillations. Whatever the cause, non-plumb targets detract from the desirable degree of accuracy which can be obtained using scanning laser devices of the type described in the '834 patent.

In response to this problem, Chief Automotive introduced an improved Velocity® scanner employing vertically spaced apart scanning laser beams, thereby permitting determination of whether individual ones of the coded targets are in plumb relative to the vehicle, and the extent of any target inclination. This scanner is a decided improvement over single beam scanners.

Generally, laser vehicle alignment scanning systems generate high frequency laser beams which are detected in an analog fashion by strategically placed detectors. A potential problem in such systems is the presence of ambient light which may interfere with proper detection of the desired high frequency laser beam(s). One strategy to avoid ambient light interference involves cutting off a lower frequency portion of the detected signal in an effort to eliminate ambient light noise. However, this inevitably lowers the signal strength. As a consequence, a compromise must be made between signal strength and noise from ambient light interference.

There is accordingly a need in the art for vehicle repair laser scanning apparatus and methods having improved detection devices which have increased signal to noise ratios.

SUMMARY OF THE INVENTION

The present invention overcomes the problems outlined above, and provides an improved laser scanning system, and corresponding methods, for determining frame or unibody alignment of a vehicle. The system includes a scanning apparatus together with at least one reflective laser beam target adapted for placement in a known relationship relative to a selected reference point on a vehicle to be scanned. The scanning apparatus has a laser assembly operable to direct laser beams toward the vehicle target, and corresponding detector assemblies for receiving reflected laser beams from the target. Preferably, the laser assembly is operable to direct a pair of individual laser beams spaced vertically from each other by a known distance toward the target, and to detect the reflected beams from the target. In this way, using a microprocessor operably coupled with the scanning apparatus, it is possible to calculate individual, upper and lower, three-dimensional spatial coordinates of the target using the respective vertically spaced apart laser beams. This in turn permits determination of whether the target is truly in plumb (i.e., vertical), and the extent of deviation from plumb for the target. A particular feature of the scanning apparatus is the use of detector assemblies each comprising a substantially parabolic reflective surface together with a strategically located radiation detector position substantially at the focal point of the reflective surface.

In preferred forms, the laser assembly includes a pair of laser units, with each laser unit including a pair of vertically spaced apart lasers. The laser assembly is preferably stationary, with the overall apparatus including a pair of rotating mirror assemblies respectively located on opposite sides of the laser assembly. Each such mirror assembly comprises an upright mirror having a relatively wide reflective surface and a relatively narrow reflective edge; this permits discrimination between reflections from the wide mirror surfaces versus the narrow reflected edge surfaces. The detector assemblies advantageously include a block presenting an outboard parabolic reflective surface with a pair of vertically spaced apart openings therethrough; the associated upper and lower lasers are positioned so as to direct laser radiation through the block openings.

In practice, a plurality of reflected targets form a part of the system, and are suspended from individual reference points on the vehicle. Each of the targets is individually coded so that the scanning apparatus can discriminate between the targets. Preferably, each target has vertical endmost reflective stripes or "strikes", together with a pair of obliquely oriented reflective stripes between the endmost stripes.

Preferably, the components of the scanning apparatus, and particularly the laser assembly, mirror assemblies, detectors and on-board electronics are housed within an enclosed housing. This assures that the scanning apparatus can be used in a shop environment with a minimum of contamination from ambient dust or the like.

The parabolic detector assemblies give increased signal-to-noise ratios as compared wit conventional detectors, thereby giving improved alignment accuracy.

BRIEF DESCRIPTION OF THE DRAWINGS

FIG. 1 is a side elevational view of a vehicle having coded reflective targets suspended from predetermined locations on the vehicle, and with the scanning apparatus of the invention disposed below the vehicle and in an orientation for scanning of the depending targets;

FIG. 2 is a front elevational view of the scanning apparatus;

FIG. 3 is a sectional view taken along line 3—3 of FIG. 2 and depicting further details of the internal construction of the scanning apparatus;

FIG. 4 is a vertical sectional view of the scanning apparatus;

FIG. 5 is a bottom view of the scanning apparatus, with the bottom cover plate removed;

FIG. 8 is an end elevational view of the scanning apparatus, showing the on-off switch and computer connection for the scanning apparatus;

FIG. 9 is an enlarged, fragmentary view with parts broken away and depicting the laser assembly and the associated parabolic collector and detector;

FIG. 10 is a perspective view of a preferred detector assembly in accordance with the invention, illustrating the parabolic reflective surface and the detector located at the focal point of the reflective surface;

FIG. 11 is a side elevational view with parts broken away of a target in accordance with the invention;

FIG. 12 is a side elevational view of another target;

FIG. 13 is a sectional view taken along line 13—13 of FIG. 11;

DETAILED DESCRIPTION OF THE PREFERRED EMBODIMENT

Figure 6:
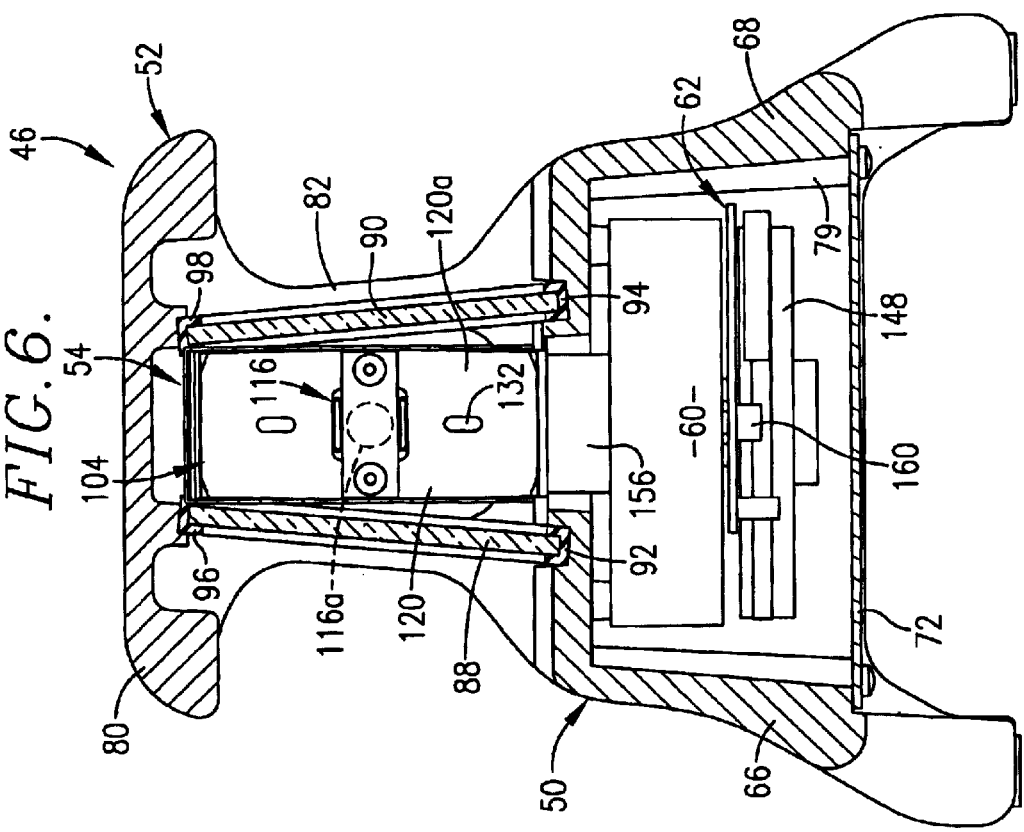
FIG. 6 is a vertical sectional view taken along line 6—6 of FIG. 2 and depicting components of the laser assembly.

Turning now to the drawings, and particularly FIG. 1, a vehicle 40 is illustrated on a lift device 42. The vehicle 40 has a plurality of individually coded targets broadly referred to by the numeral 44 suspended from specific locations around the vehicle. A factory precalibrated scanning apparatus 46 in accordance with the invention is located beneath the vehicle 40 and in an orientation for laser scanning of the suspended targets 44. As shown, the apparatus 46 is operatively coupled with a computer 48, typically in the form of a PC.

The scanner 46 is illustrated in FIGS. 2–10 and broadly includes a lower housing 50, an upper housing 52, a laser assembly 54, a pair of end-mounted mirror assemblies 56 and 58, a main control board 60 and respective mirror assembly control boards 62 and 64 (see FIG. 5).

The lower housing 50 is in the form of a metallic boxlike element presenting a front wall 66, opposed rear wall 68, end walls 69 and 69a, top panel 70 and removable bottom plate 72. An elongated component compartment 74 is thus defined between front and rear walls 66, 68 and panel 70 and bottom plate 72. It will be observed (FIG. 8) that the end wall 69a is equipped with an on-off switch 76 as well as a pin-type connector 78 allowing coupling computer 48 to the apparatus 46. Bottom plate 72 is secured to the lower housing 50 by means of connector struts 79.

Figure 7:
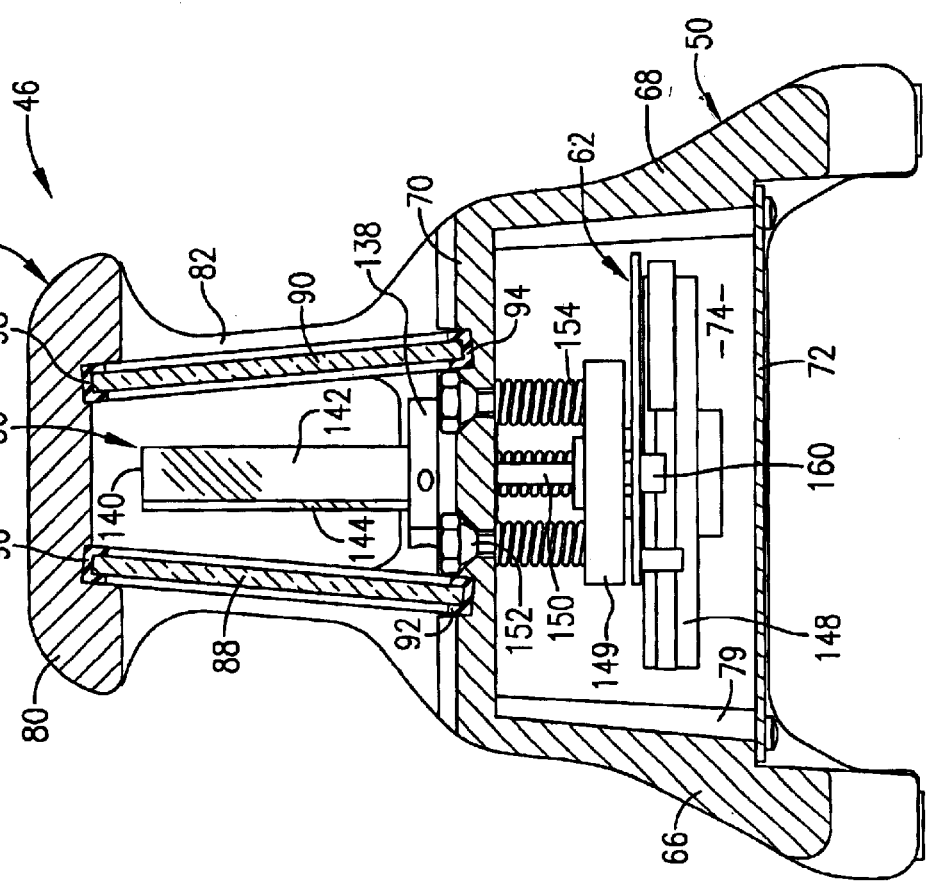
FIG. 7 is a vertical sectional view taken along line 7—7 of FIG. 2 and illustrating in detail the construction of the mirror assemblies of the scanning apparatus.

Upper housing 52 includes a top wall 80 with oblique, depending end walls 82 and 84. The upper housing 52 is secured to the lower housing 50 by means of end connectors 86 (FIG. 5). The overall upper housing 52 also includes a pair of upstanding, opposed transparent glass window panels 88, 90 which extend substantially the full length of the upper housing between end walls 82, 84. Referring to FIGS. 6 and 7, it will be seen that the panels 88, 90 are housed within elongated grooves 92, 94 provided along the length of top panel 70, as well as within grooves 96, 98 provided along the underside of top wall 80.

The laser assembly 54 is located within upper housing 52, and rests atop panel 70 of lower housing 50. The laser assembly 54 includes an upright housing cover 100 with a pair of oppositely directed, vertical dual laser units 102 and 104 therein. Each of the units 102, 104 has an upright circuit board 106, 108 equipped with electrical connectors 110, 112 as well as corresponding detector assemblies 114, 116. Additionally, the units 102, 104 have an upright mounting block 118, 120 which are secured by fasteners (not shown) to top panel 70. The blocks 118, 120 support a pair of vertically spaced apart laser diodes 122, 124 (support 118) and 126, 128 (support 120). The upper lasers 122, 126 are vertically spaced above the lower lasers 124, 128 by a known distance (e.g., 31 mm); the upper lasers emit radiation in a common upper plane, while the lower lasers emit radiation in a common lower plane, where the planes are vertically spaced apart the same known distance.

It will be observed that the blocks 118, 120 each have a corresponding outermost parabolic reflective surface 118a and 120a, as well as a pair of vertically spaced apart, oblong openings 130 (block 118) and 132 (block 120). Further, the inner faces of each of the blocks 118, 120 have recesses 134 (block 118) and 136 (120) which are in registry with the corresponding openings 130, 132. As illustrated in FIG. 9, the respective diodes 122–128 have outwardly projections received within the block recesses. The preferred laser diodes emit 250 nm visible laser radiation.

The detector assembly 114 includes, in addition to reflective surface 118a, a detector 114a which is located substantially at the focal point of the surface 118a. The detector 114a is supported by means of a pair of laterally spaced apart, outwardly extending arms 137 and crosspiece 137a. A transparent cover 137b is secured to crosspiece 137a and is in covering relationship to detector 114a as shown (FIG. 9). The detector 116 is identical to the assembly 114, and like reference numerals have therefore been applied to this structure.

The mirror assemblies 56, 58 are mounted within and adjacent the ends of the upper housing 52. These assemblies are identical and therefore only assembly 56 will be described in detail. Referring to FIGS. 4, 5 and 7, it will be seen that the assembly 56 includes a rotatable hub 138 supporting an upstanding, planar, front reflective-surfaced mirror 140; the mirror 140 is silvered on one broad face 142 thereof, as well as along one narrow, waist-cut beveled edge 144. This beveled edge produces a secondary narrow mirror used to generate accurate synchronization signals. The edge is formed by grinding a precise waist cut radius and coating the edge so that edge-reflected laser beams are caused to strike back at the midpoint between the upper and lower lasers, namely at the detectors 114, 116. The radius cut is also at a bevel angle that permits the full thickness of the mirror to be centered on the laser beam at the precise angle which will reflect the beam toward the associated detector.

As shown, the hub 138 is mounted within an opening 146 provided in top panel 70 of lower housing 50. The hub 138, and thus mirror 140, are rotated by means of a brushless electric motor 148 and a drive shaft 150 coupled to hub 138. The hub motor 148 is mounted on a three-point suspension to allow the mirror 140 to be adjusted mechanically to spin at a true vertical axis parallel to the other mirror. While these adjustments can be made mechanically, it can be difficult to obtain an exact alignment. Further, the internal rotating parts of the apparatus 46 are protected by the glass panels 88, 90 which may distort the rotational velocity of each hemisphere of scan due to the dissimilar index of refraction between the glass and air. A mathematical correction algorithm is applied by the post-computer 48 to correct all data for these potential aberrations.

The rotational velocity of each motor 148 is controlled to produce a torque-ripple of less than 10 ppm of rotation speed. The motor 148 and control board 62 (Part No. RMOTN2028GE-ZZ from Sharp Electronics) are supported beneath top panel 70 by means of a mounting block 149 and three connector bolts 152 extending downwardly from panel 70. Each of the bolts 152 carries a compression spring 154.

The main control board 60 is situated below laser assembly 54 and is secured to the underside of top panel 70. An electrical connector 156 extends upwardly from board 60 through an opening 158 in panel 70, for electrical connection with connectors 110, 112 associated with the laser units 102, 104. The main control board includes appropriate electronics for software control of the laser assembly 54.

Each of the mirror control boards 62, 64 includes Hall-effect sensor 160, 162 as well as other conventional electronics including a magnetically encoded tachometer ring used in the control of the respective mirror assemblies 56, 58. This provides a motor tachometer signal that is amplified to produce a square wave signal. This signal transitions high to low at one degree increments, providing 360 pulses per revolution of the motor. The speed control signal to the motor is generated by triggering a one-shot pulse of precise duration. The one-shot is implemented digitally, using the system clock running at 29 MHz by dividing the clock down to generate a precise millisecond pulse. The pulse is used to switch a reference voltage into a low-pass filter. The output of the filter rises in voltage when the speed of the motor is too slow, and drop in voltage if the speed of the motor is too fast. In this way, the motor speed is controlled to a precise rpm. A feedback loop is used to stabilize the rotational speeds of the motors at respective, constant speeds. This produces hub rotational velocities which are constant. Although not shown, the main control board 60 and mirror control boards 62, 64 are electrically connected by appropriate cabeling.

FIGS. 11 and 13 depict a typical coded target 44, which includes an elongated reflective body 164 with opposed end caps 166, 168. The body 164 is somewhat trapezoidal in cross-section as best seen in FIG. 13, and has a reflective face 170. In the illustrated target, a total of four upright, elongated mirrored reflective stripes 172, 174, 176, 178 are provided (sometimes referred to as "strikes"), with non-reflective regions 179 therebetween. It will be observed that the reflective stripes 172 and 178 are vertically oriented at known slopes and are considered reference stripes. The intermediate stripes 174 and 176 (center strikes) are obliquely oriented so that the non-reflective distance between the intermediate stripes and the reference stripes varies throughout the height of the target. An upper hanger element 180 is secured to body 164 and permits suspension of the target from a selected automotive location. FIG. 12 illustrates a hanger 44 of a different length as compared with that illustrated in FIGS. 11 and 13. However, the FIG. 12 hanger likewise includes a body 164, end caps 166, 168, hanger element 180 and reflective surfaces 172–178. It will be appreciated that different targets 44 have different patterns of reflective surfaces thereon so that the scanner 46 may discriminate between individual coded targets, i.e., each target has a unique set of strike widths for the four strikes. Moreover, each target has an individual identification numbers associated therewith. The following criteria are used with the targets 44: minimum strike width, 2 mm; each strike width is at least 1½ mm wider than the next narrowest strike width; minimum non-reflective gap between strikes, 3 mm; the targets should be relatively narrow so as not to block the view of other targets; and the targets are configured for use with a single-line scanner to measure target heights over a range of ±75 mm.

As delivered from the factory, the apparatus 46 is precalibrated to account and compensate for inevitable manufacturing tolerance errors and the like, e.g., nonvericality of the mirrors 140 and actual rotational speeds of these mirrors. Such factory calibration is carried out using a calibration program explained below and fully set forth in the source code appendix. The calibration parameters (52 in number) are stored in the nonvolatile memory of the apparatus 46 and are recalled during the course of actual use of the scanner.

In use, the scanning apparatus 46 is positioned beneath the vehicle 40 in an orientation such that the radiation emitted by the laser assembly 54 will strike the reflective faces of the coded targets 44 suspended from vehicle reference points. As illustrated in FIG. 1, this is often accomplished by placement of the apparatus 46 beneath the center region of the vehicle on the lift device 42. The computer 48 is coupled with the apparatus 46 as shown.

During scanning operations, the mirrors 140 are rotated at determinable but slightly different (e.g., 1%) speed (e.g., 390 rpm) while the laser assembly 54 is operated. Specifically, the upper lasers 122, 126 are operated simultaneously and the lower lasers 124, 128 are also operated simultaneously. However, the upper and lower laser pairs are operated alternately owing to the fact that only a single detector assembly 114 or 116 is used. It will be appreciated that the laser beams emitted by the diodes 122–128 pass through the associated block openings 130 or 132. During operation of the upper laser pair, a 360° scan is generated so that the reflective faces of each of the targets 44 is scanned. The radiation reflected from the targets 44 impinges upon the mirrors 140 and is reflected toward the parabolic surfaces 118a, 120a, this being illustrated by arrow 181 (FIG. 9). the parabolic surfaces are operable to reflect the radiation towards the focal point of the surface, where the detectors 114a, 116a are located. It will be appreciated that each sweep of every target generate eight on-off (reflective/non-reflective) events; the first and last of those events—the leading or "on" edge of the first reflective reference stripe, and the trailing "off" of the last reflective reference stripe—are of special significance in the determination of target position, as will be explained.

Furthermore, as the mirrors 140 rotate, light is reflected not only from the broad mirrored surfaces 142, but also from the narrow edge surfaces 144. The difference between broad face and edge radiation can be detected because of the intensity of light at the detector; the more intense light denotes edge-reflected radiation, whereas less intense light denotes broad face-reflected radiation. Hence, as the mirror rotation occurs, at some point for each target, the edge radiation will be detected; this is deemed the zero position. The next time edge radiation is detected, it is known that the mirror has traversed 360°. The time between the zero and 360 positions divided by 360 gives the travel time per degree of arc.

Inasmuch as the distance between the mirrors 140 is known, measurement of the angles between each respective target and the mirrors 140 allows calculation of upper X, Y coordinates for each of the targets. Such calculations involve simple triangulation trigonometry, as explained in U.S. Pat. No. 5,801,834 incorporated by reference herein. As the upper laser pair scans each target 44, the vertical position of the scan on the target is ascertained by determining the time between reflections from the reference stripe 172 and 178 and intermediate, oblique stripes 174 and 176. For example, and considering FIG. 11, a scan from left to right would generate different non-reflective times depending on the vertical location of the scan. With this information, and knowing the distance between the vertical position of the scan and the tip of hanger element 180, the upper Z coordinate for each target is calculated.

After the scan by the upper lasers 122, 126, the lower lasers 124, 128 are operated in the same manner, to achieve a 360° scan of the targets 44. Again, the lower lasers permit calculation of a lower X, Y and Z coordinate for each of the targets. Of course, if the distance between the upper and lower Z coordinates for a given target equals the distance between the upper and lower lasers, that target is deemed to be essentially in plumb.

In practice, the upper and lower X, Y and Z coordinates for each target are averaged and these average X, Y, Z coordinates are used for determining the extent of frame or vehicle straightening required. Also, a vector is generated between the upper and lower X, Y and Z coordinates for each target, and the divergence of this vector from vertical can be used to determine the angle of inclination of the target.

FIGS. 14–19 are flow diagrams illustrating the preferred scanner driver software (the user program) which is employed by the actual user of apparatus 46 in the field. The user program software is resident on the computer 48 coupled with the apparatus 46.

Figure 14:
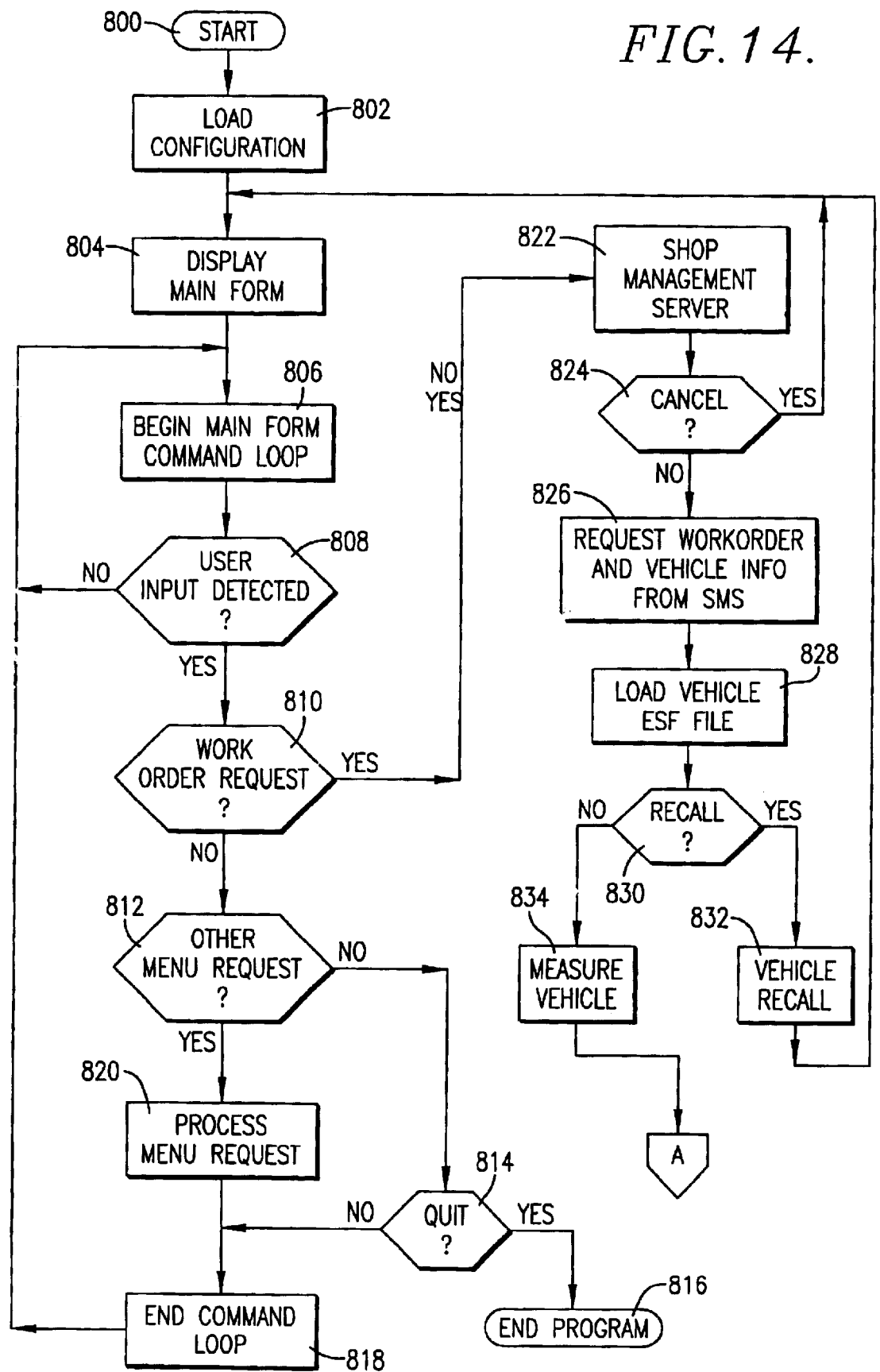
FIG. 14 is a computer software flow diagram of the user program used to control the operation of the scanning apparatus in the field.

Turning first to FIG. 14, the main program flow is depicted. The user initiates the program at step 800, where-upon in step 802 the configuration for the system is loaded; this includes user preferences such as language and scanner type, and the calibration parameters derived from the factory calibration program and resident in the scanner's nonvolatile memory. Next, in step 804, the main screen is displayed which permits entry into all aspects of the program via a main menu. In step 806, the main form command loop is initiated which includes step 808. If no user input is detected, the program loops back to step 806. If such input is detected, the program proceeds to step 810 where a work order request query is carried out. If there is no work order request, the program proceeds to step 812 and seeks any other menu request. If there is no such menu request, the program proceeds to step 814 where a quit operation query is performed allowing the user to quit the program in step 816. If the answer in step 814 is NO, the program proceeds to step 818 where the command loop is terminated and the program loops back to step 806. Reverting back to step 812, if the answer is YES, the program processes the menu request in step 820 and proceeds to step 818.

Returning to step 810, the work order request query, if the answer is YES, the program executes a shop management server (SMS) program 822. A cancel query is made in step 824, so that if the answer is YES, the program reverts to step 804. If the answer is NO, in step 826, work order and vehicle information are requested from the shop management server. Once this step is completed, the program proceeds to step 828 where vehicle information is loaded. This comprises a specification file and graphic for the individual vehicle being measured. Next, in step 830, a recall query is performed. If the vehicle in question was previously measured, that information would be in computer memory. In such a case, the stored information is recalled via program 832, and the program then loops back to step 804. If the answer in step 830 is NO, the program proceeds to vehicle measurement program 834, which includes program A, FIG. 15.

Figure 15:
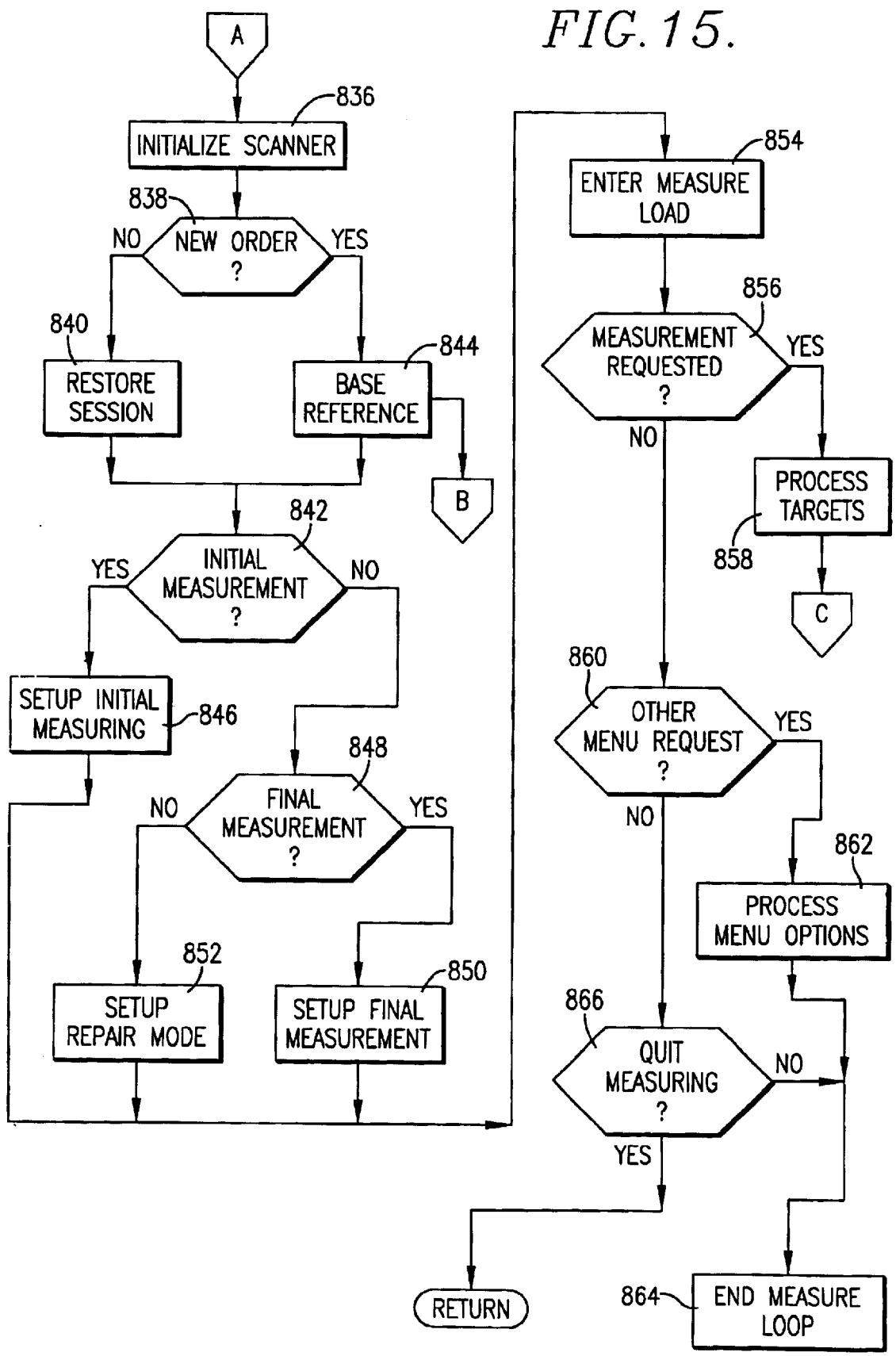
FIG. 15 is a computer software flow diagram illustrating the vehicle measurement steps carried out during use of the scanning apparatus.

Referring to FIG. 15, there are three measurement modes to be considered—initial, repair of final measurements. The program initiates with step 836, a scanner initialization, followed by a new order query in step 838. If the answer at step 838 is NO, the program proceeds to step 840 where the measurement session is restored and the program proceeds to step 842. If the answer at step 838 is YES, meaning that an initial measurement is desired, the base reference program 844 is initiated, FIG. 16 later to be described. After the base reference is established in program 844, the program goes to step 842 where an initial measurement query is made. If the answer is YES, the program proceeds to step 846 where an initial measuring setup is made. If the answer is NO, meaning that there was a previous measurement, the program proceeds to step 848 which is a final measurement query. If the answer is YES, in step 850, the system is set up for final measurement. If the answer is NO, the program proceeds to step 852 to set up the repair measurement mode for the vehicle, i.e., where the apparatus 46 is used during actual frame or vehicle straightening to monitor the course of the repair. In either case, from steps 850 or 852, the program in step 854 enters the measurement loop. This involves in step 856 a measurement requested query. If such a request has been made, the program proceeds to the target processing program 858, FIG. 19. If the answer at step 856 is NO, another menu request query is performed in step 860. If the answer at this step is YES, user input options are processed in step 862 and the program proceeds to the end measure loop 864. If the answer at step 860 is NO, the proceeds to step 866, a quit measuring query. If the answer at this step is YES, the program returns. If the answer is NO, it proceeds to loop 864.

Figure 16:
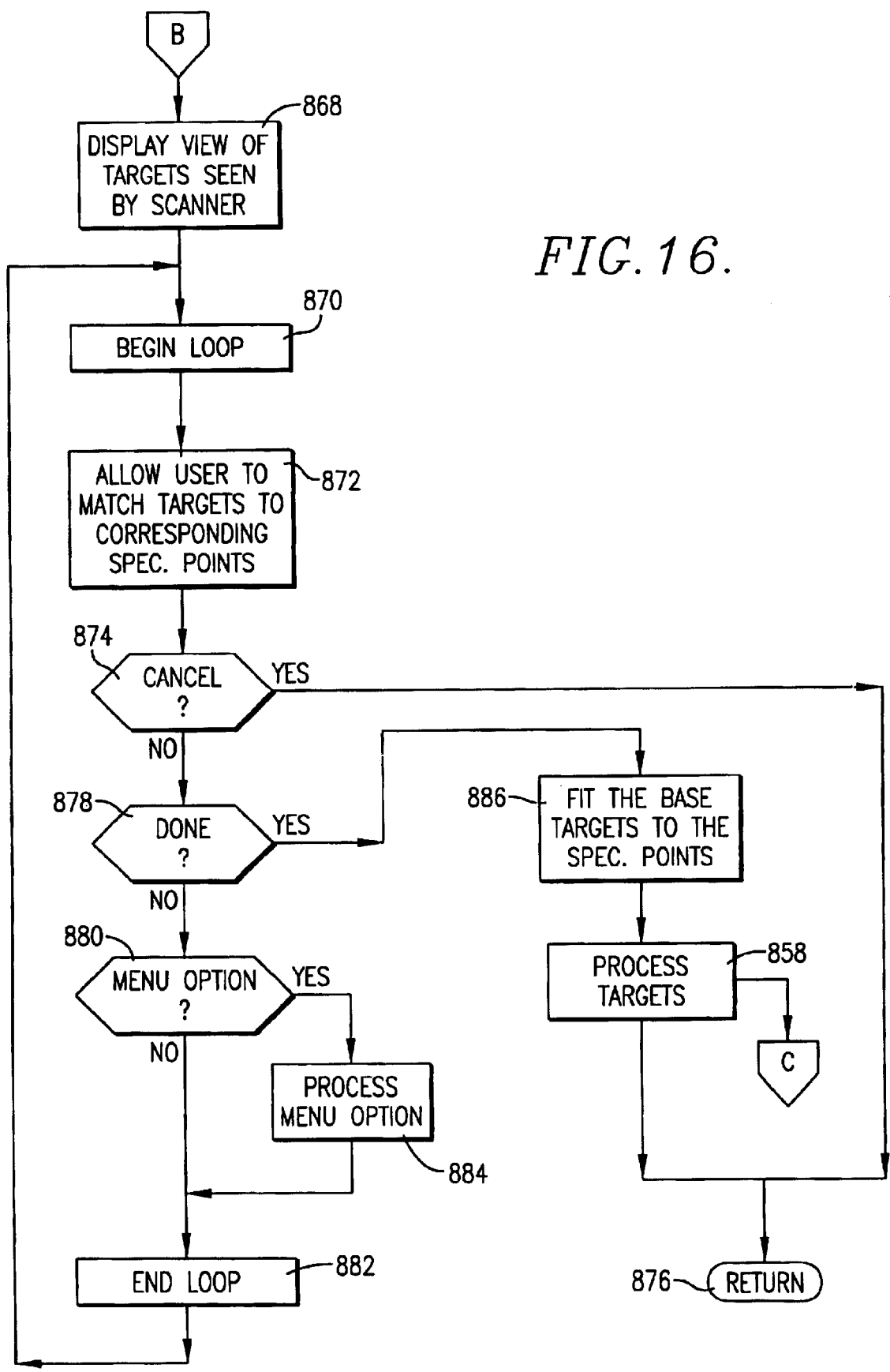
FIG. 16 is a computer software flow diagram illustrating the base reference steps carried out during use of the scanning apparatus.

The base reference program is illustrated in FIG. 16. It will be appreciated that initially the apparatus 46 determines the position of the targets 44 relative to the apparatus itself using an internal coordinate system. However, the targets are also located with reference to the manufacturer's specification, using a different coordinate system. In the base reference software routine, the two coordinate systems are brought together, usually using four targets located about the central region of the vehicle.

This involves, in step 868, an initial display of the targets seen by the scanning apparatus 46 using the internal coordinate system. Next, a loop 870 is entered where, in step 872, the user is allowed to match using manual inputs the targets seen by the scanner to corresponding vehicle manufacturer-provided specification points. Once this is accomplished, the programs proceeds to step 874 which is a cancel query. If the answer is YES, the program proceeds to return 876. If the answer is NO, a job done query is made at step 878. If the answer at this step is NO, the program proceeds to a menu option query at step 880. If no option is selected, end loop step 882 is entered, and the program reverts to step 870. If at step 880 the answer is YES, in step 884, the selected menu option is processed and the program proceeds to loop 882.

Figure 19:
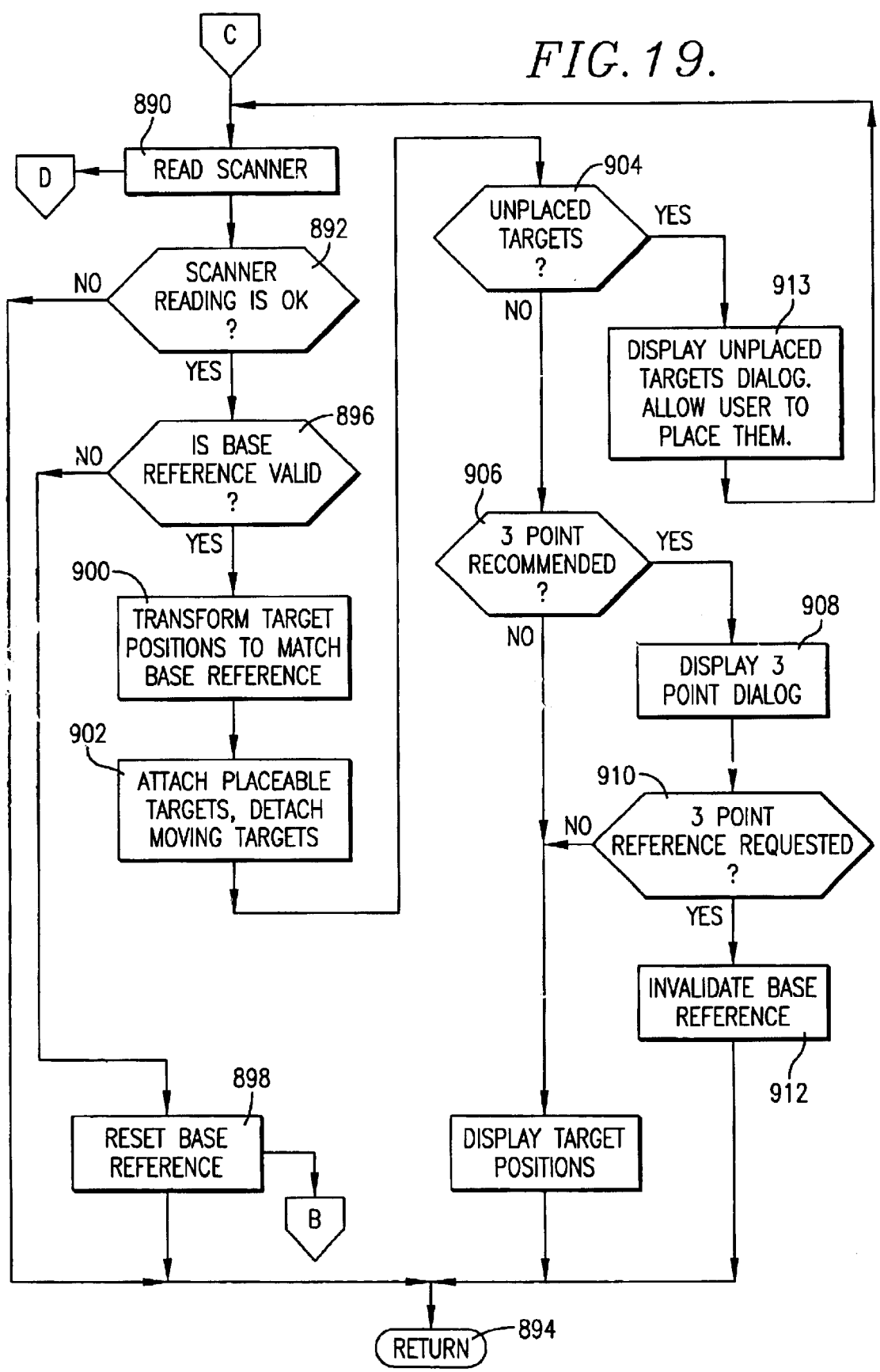
FIG. 19 is a computer software flow diagram illustrating the target processing steps carried out during use of the scanning apparatus.

Returning to the done query at step 878, if the answer is YES, the program in step 886 fits the base targets to the manufacturer's specification points, and the program proceeds to the target processing program 858, FIG. 19. This involves, to the extent feasible, adjusting the two coordinate systems so that the origins thereof are coincident.

Figure 17:
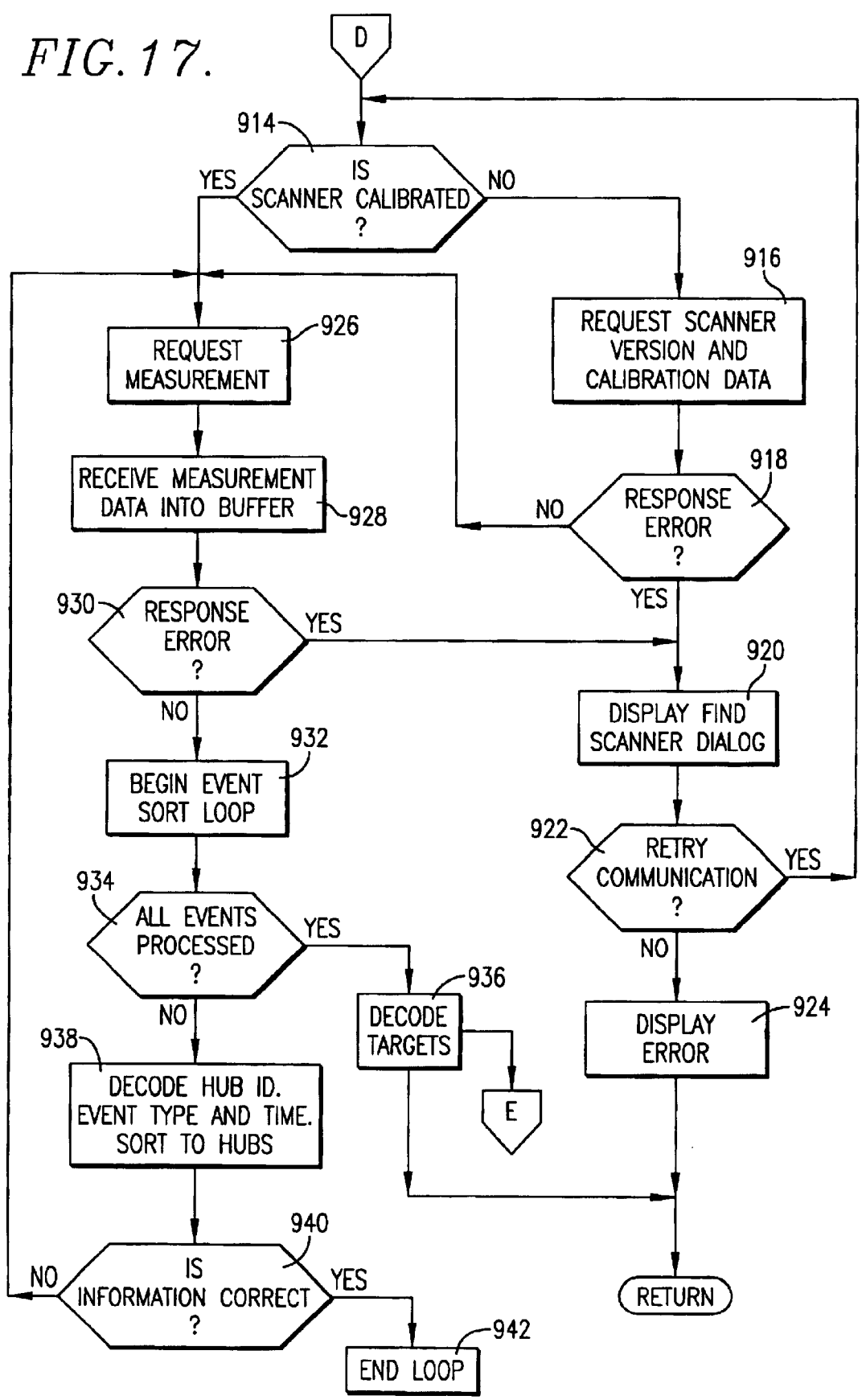
FIG. 17 is a computer software flow diagram illustrating the scanner read steps carried out during use of the scanning apparatus.

In the FIG. 19 target processing program, the first step is to read the scanner information via program 890, FIG. 17. After this is accomplished, a scanner reading query is made in step 892. This involves a determination as to whether the scanner readings are within predetermined limits designed to confirm the validity of the scanner readings. If the answer at step 892 is NO, the program proceeds to the return at step 894. If the answer at step 892 is YES, in step 896 there is a query to determine whether the base reference is valid. Again, this involves a determination of whether the base reference is within predetermined limits. If the answer at step 896 is NO, the program enters the reset base reference program 898, FIG. 16 described previously, and a new base reference is determined. If the answer is YES, the program proceeds to step 900 where the target positions ascertained by the scanner are transformed using the base reference. Next in step 902, the program "attaches" the valid targets and "detaches" moving or invalid targets. This involves comparing the transformed target data with the specification data. If these are not matched, the specification is searched for possible matches within 50 mm. If this cannot be done, the target is deemed detached. If a target was attached in the previous measurement, the new position is compared with the previous one. If the difference is 30 or more mm, the target is considered "moving" and is detached. Thereupon, in step 904, an unplaced targets query is made. If there are no unplaced targets, an unplaced target dialog screen is displayed (step 913) and the user is allowed to place targets via manual inputs. Thereafter, in step 906, a three point recommendation query is made. If the user elects to use the three point method, which involves establishing a base reference using the best three of four base reference measurements, a three point dialog is displayed in step 908. use of the three-point method may be selected if one of the 4-base reference points is adjacent a damaged region of the vehicle for example. Next, in step 910, a three point reference request query is made. If the answer is NO, the target positions are displayed and the program proceeds to return 894. If the answer is YES, the previous base reference is invalidated (step 912), and the program proceeds to return 894.

As described previously, in step 890, the read scanner program is executed, FIG. 17. This involves an initial query in step 914 to determine whether the scanner has been calibrated. If the answer is NO, the program in step 916 requests stored scanner version and calibration data from the scanner and proceeds to step 918 where a response error query is made. If the answer at step 918 is NO, the program reverts to the YES leg of step 914. If the answer at step 918 is YES, the program proceeds to step 920 where the fined scanner dialog is displayed. Thereafter, a retry communication query is made in step 922. If the answer is YES, the program returns to initial step 914. If the answer is NO, a display error screen is generated in step 924.

Returning to step 914, if the answer to the scanner calibration query is YES, the next step 926 requests a scanner measurement involving a 360 sweep by the upper and lower laser pairs. The data received from this measurement is stored in buffer in step 928. This data is in the form of "event times" generated during scanning. In particular, the program considers each of the lasers as a "hub", there being an upper left, lower left, upper right and lower right hub. Moreover, as explained previously, each sweep of each target generates eight on-off reflective events. Thus, the buffer collects a series of encoded events during a measurement sweep, each event encoded into 32 bits of information. This information defines the type of event, e.g., "on", "off", 0/360° edge reflection (synchronization pulse) or broad mirror panel reflection, or stray reflections. The information also represents the time the event occurred during the measurement sweep. That is, each event is "time-stamped" as it occurs. The time base is a free-running counter that counts down the 29 MHz clock. There are 25 bits in the counter, so the counter rolls over about once per second. This is adequate to uniquely timestamp every event that can occur during a scan.

Scanning is started when the apparatus 46 receives a scan command from computer 48. When this signal is received, a timestamp latch is armed to begin timestamping events for each hub, starting with the next occurring edge reflection for that hub. From this point on, whenever an event occurs, a precise system time is recorded as 25 bits in a 32-bit latch. The remaining seven bits are used as "tag" bits that identify the exact conditions causing the event. The latched information is immediately saved in a first-in-first-out buffer, and the process is continued until each of the four hubs has collected data. At this point, the buffer contains four complete scans, and should contain eight leading edge and eight trailing edge reflection events. Each of these synchronization pulses marks the start or end of a complete hub scan. As soon as scanning is complete, the entire buffer is downloaded back to the computer 48 as a binary stream of 8-bit bytes using an UART transmitter.

After this event data collection, in step 930, a response error query is made. If the answer is YES, the program reverts to step 920. If the answer is NO, an event sorting loop 932 is entered. In this loop, an all events processed query is made, step 934. If all of the events were stored in buffer, the program proceeds to the target decode program 936, FIG. 18. If all events are not processed, in step 938 the hub identifications are decoded together with event types and times, the latter being sorted to individual hubs in the buffer. After step 938, a query is made in step 940 as to whether the scanning information is correct. For example, if there is an invalid target or insufficient data has been gathered, the answer at step 940 would be NO, and the program would revert to step 926 for another measurement. If the answer at step 940 is YES, end loop 942 is entered.

Figure 18:
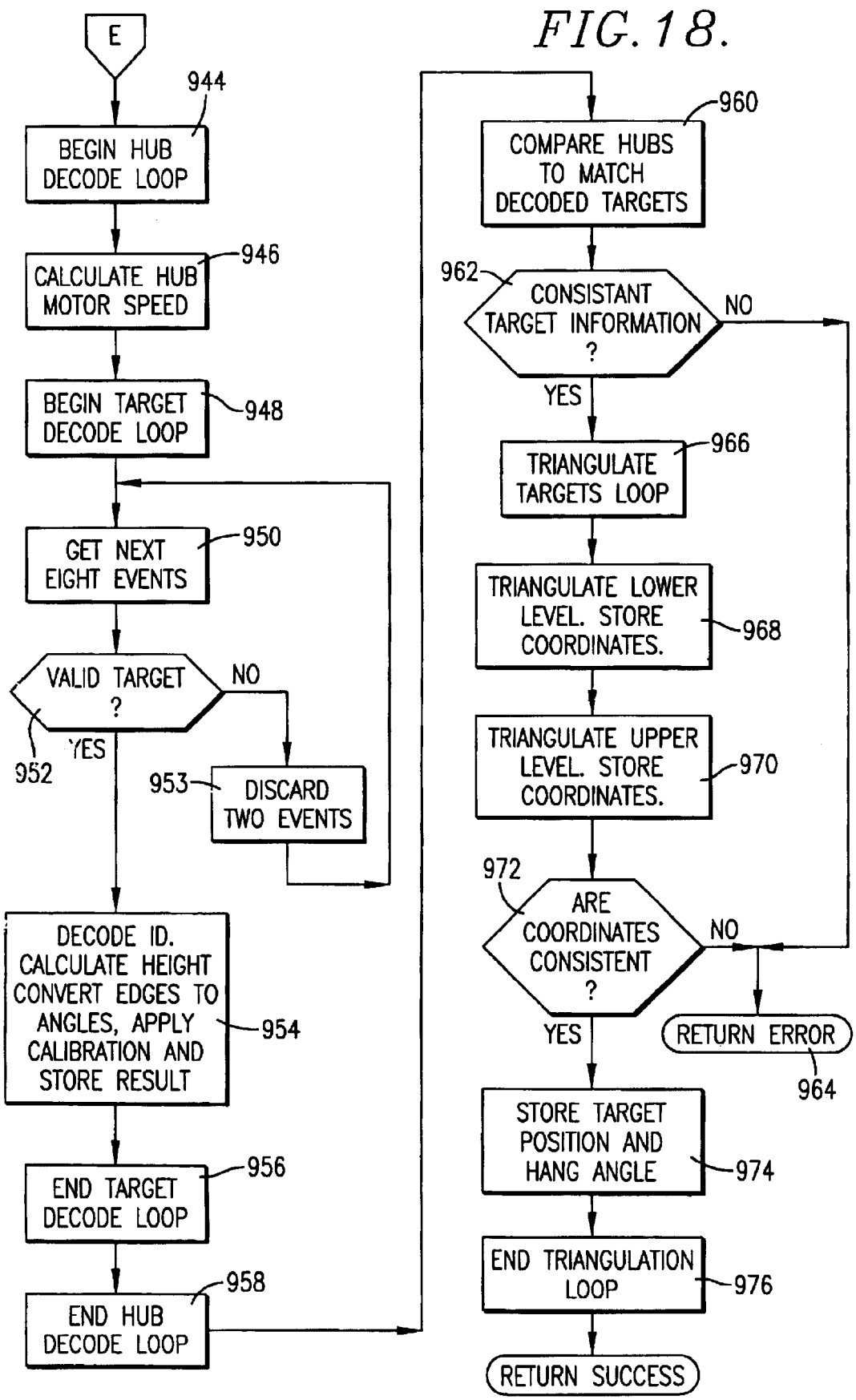
FIG. 18 is a computer software flow diagram illustrating the target decoding steps carried out during use of the scanning apparatus.

The target decode program, FIG. 18, involves a hub decode loop 944 wherein hub motor speeds are calculated, step 946, as explained previously. In order to make this calculation, the zero and 360° synchronization times for each mirror are retrieved from the buffer. Once the motor speeds are calculated, the target decode loop is begun, step 948. The decode loop includes in step 950 the obtention of the next eight 4-byte event data packets for each target as the mirrors rotate. As explained above, each target has four reflective regions. As the laser radiation sweeps each target, there are a total of eight events, namely the times at which the radiation strikes the leading and trailing edges of each of the four reflective regions. After step 950, a valid target query is made in step 952. This involves determining whether the eight events defining the four reflective regions correspond to a valid target code. If the answer is NO, the program in step 953 discards the first two of the eight recorded events and loops back to step 950. This continues until a valid target answer of YES is obtained in step 952. When this occurs, the program moves to step 954 where the target identification is decoded and the sweep height on each target is calculated using the times between events as mentioned previously. This gives the Z axis coordinate for each target. Also, the first and last reflective events for each target are converted to angles using the synchronization times. These results are then stored and the program moves to the end target decode loop 956 and end hub decode loop 958.

In this sequence, in step 960 each of the four hubs is compared to match decoded targets, i.e., hub and target data are matched. Next, in step 962 a query is made as to whether consistent target information has been obtained, that is, whether the hubs and targets have been correctly matched. If the answer is NO, a return error step 964 follows. If the target information is consistent, the program proceeds to step 966 where each of the targets is triangulated relative to the mirrors 140 of apparatus 46. Specifically, four angles are known for each target: the angles between the leading edge of the first-swept vertical stripe (the first "on" event) and the two mirrors 140; and the angles between the trailing edge of the last-swept vertical stripe (the last "off" event) and the two mirrors 140. Therefore four triangulation calculations are made for each target, an upper pair of triangulations using the angles representative of the first "on" and last "off" events from the upper laser sweep and a lower pair of triangulations likewise using the angles representative of the first "on" or last "off" events from the lower laser sweep. Thus, in step 968, the lower level laser sweep data is employed to generate and store in memory two lower X, Y, Z coordinates for each target. Similarly, in step 970, the upper level laser sweep data is employed to generate and store in memory two upper X, Y, Z coordinates for each target. Next, in step 972, a determination is made as to whether the stored target coordinates are consistent, i.e., whether the upper and lower coordinates are within predetermined limits. If the answer is NO, the program proceeds to return error step 964. If the coordinates are within limits (dependent chiefly upon the vertical distance between laser pairs), the upper and lower coordinate pairs for each target are averaged, and these upper and lower coordinate averages are again averaged to yield a final X, Y, Z coordinate for each target. This final coordinate is stored in step 974. Also, the program generates a vector using the upper and lower coordinates for each target, these vectors being used to ascertain the target hang angles which are also stored. This being done, in step 976, the triangulation loop is terminated and a successful measurement is completed.

As explained previously, each scanning apparatus 46 is factory precalibrated. Generally speaking, this calibration is carried out using an optical bench having a plurality of targets 44 spaced around the bench at precisely known locations. An individual apparatus 46 is placed in the middle of the bench with a coupled computer 48, and is operated to scan the targets as described above. This generates a series of apparent target positions using the uncalibrated apparatus 46. These target locations will typically be in error to a greater or lesser extent, as compared with the known position of the targets, owing to slight manufacturing tolerance errors, e.g., in the position and spacing of the lasers 122, 126 and 124, 128, or in the orientation of the mirrors 140.

Next, the calibration program undertakes an iterative, non-linear fit to an empirical trigonometric equation, and generates coefficients for this equation which give the best fit. This equation is:

$$\text{RealAngle} = a + ALL + BLL \times \sin(1 \times a + DLL) + CLL \times \sin(2 \times a + ELL) + FLL \times \sin(3 \times a + GLL) + HLL \times \sin(4 \times a + ILL)$$

where ALL, DLL, ELL, GLL and ILL are angle corrections as lead/lag offsets for each of the fundamental, first harmonic, second harmonic, third harmonic and fourth harmonics (as denoted by the multipliers 1, 2, 3 and 4), and BLL, CLL, FLL and HLL are the respective magnitude multipliers for each harmonic. The above equation applies these coefficients so as to correct the observed angles a to correct angles.

As a part of this procedure, the program completes a conventional mean squared error (MSE) calculation in order to produce coefficients for the trigonometric equation giving the lowest possible MSE. Once these coefficients have been determined, they are saved in an INI formatted file in the scanner's non-volatile memory, and can be retrieved for use when the apparatus 46 is used in the field, as described above.

Additionally, the calibration program employs another equation to correct for pitch angle of the laser beams as they vary during a full 360° scan. This equation makes a minor correction to the observed target height; this height correction gets larger as targets further from the scanner are scanned, because the beams are pitched up/down owing to, e.g., a tilted mirror. The pitch angle calibration equation used is:

$$\text{Pitch angle} = AP + BP \times \sin(a + DP)$$

where AP is the average pitch angle (laser beams drawing cones), DP is the phase, BP is the magnitude of a tilted plane and a is the rotational angle to the target. Accordingly, the true height of each target is expressed by the equation:

$$\text{True height} = H + \sin(\text{Pitch angle})$$

where H is the observed height for the target. The coefficients generated by this calculation are also stored in memory.

The calibration program is reproduced in its entirety in the attached source code appendix.

The use of detector assemblies in accordance with the invention including substantially parabolic reflector surfaces together with detectors mounted substantially at the focal points of the parabolic surfaces yields a number of significant advantages. Most important, detector assemblies of this type give improved signal-to-noise ratios owing to the fact that a higher proportion of the laser radiation is collected as compared with the use of simple focusing lenses and detectors. As a consequence, the laser scanning systems of the present invention give more accurate alignment information, thereby facilitating vehicle repair.

While in the preferred embodiment described above, use is made of a total of four laser diodes 122–128, two vertically spaced diodes 122, 124 and 126, 128 on the respective supports 118 and 120, the invention is not so limited. For example, only two diodes may be used, one mounted on each of the supports 118, 120, if desired, along with the preferred parabolic detector assemblies. Such a two-diode design in many instances will give sufficiently accurate scanning data, although the preferred four-diode design can give greater accuracy and the ability to compensate for out of plumb targets.

We claim:

1. In a laser scanning system for determining frame or unibody alignment of a vehicle including at least one reflective laser beam target adapted for placement in a known relationship relative to a selected vehicle reference point, laser scanning apparatus comprising a laser assembly operable to direct a laser beam toward said target, and a detector assembly for receiving a target-reflected laser beam from said target, the improvement which comprises a detector having a substantially parabolic reflective surface oriented to reflect said target-reflected laser beam to the focal point of said substantially parabolic surface, and a detector located substantially at said focal point, said laser assembly including a pair of laser units, each laser unit comprising a pair of vertically spaced apart laser-generating devices.

2. The system of claim 1, there being an opening extending through said parabolic reflective surface, said laser assemblies oriented for directing said laser beam through said opening.

3. The system of claim 2, said detector assembly comprising a pair of substantially parabolic reflective surfaces, each of said substantially parabolic reflective surfaces having an opening therethrough, said laser assebly including structure for directing a respective laser beam through each of said openings.

4. The system of claim 1, including a pair of reflective laser beam targets each adapted for placement on said vehicle at predetermined reference points.

5. The system of claim 4, said targets being individually coded.

6. In a laser scanning system for determining frame or unibody alignment of a vehicle including at least one reflective laser beam target adapted for placement in a known relationship relative to a selected vehicle reference point, laser scanning apparatus comprising a laser assembly operable to direct a laser beam toward said target, and a detector assembly for receiving a target-reflected laser beam from said target, the improvement which comprises a detector having a substantially parabolic reflective surface oriented to reflect said target-reflected laser beam to the focal point of said substantially parabolic surface, and a detector located substantially at said focal point, said laser assembly being stationary, there being a pair of rotating mirrors respectively located on opposite sides of the laser assembly, each of said rotating mirrors comprising an upright mirror having a relatively wide surface and a relatively narrow reflective edge.

7. The system of claim 6, said laser assembly and said rotating mirrors located within a housing presenting transparent wall surfaces for passage of said laser beams therethough.

8. The system of claim 6, including a pair of reflective laser beam targets each adapted for placement on said vehicle at predetermined reference points.

9. The system of claim 8, said targets being individually coded.

10. In a laser scanning system for determining frame or unibody alignment of a vehicle including at least one reflective laser beam target adapted for placement in a known relationship relative to a selected vehicle reference point, laser scanning apparatus comprising a laser assembly operable to direct a laser beam toward said target, and a detector assembly for receiving a target-reflected laser beam from said target, the improvement which comprises a detector having a substantially parabolic reflective surface oriented to reflect said target-reflected laser beam to the focal point of said substantially parabolic surface, and a detector located substantially at said focal point, there being an opening extending through said parabolic reflective surface, said laser assembly oriented for directing said laser beam through said opening, said detector assembly comprising a pair of substantially parabolic reflective surface, each of said substantially parabolic reflective surface having a pair of vertically spaced apart openings therethrough, said laser assembly including structure for directing a laser beam through each of said openings.

11. The system of claim 10, said laser assembly operable to direct each of said laser beams through a 360° sweep.

12. The system of claim 11, including a pair of reflective laser beam targets each adapted for placement on said vehicle at predetermined reference points.

13. The system of claim 12, said targets being individually coded.

14. In a method of laser scanning for determining frame or unibody alignment of a vehicle including the steps of placing at least one reflective laser beam target in a known relationship relative to a selected vehicle reference point, laser scanning said target by directing a laser beam from a source toward said target, and detecting a target-reflected laser beam from said target, the improvement which comprises directing said laser-reflected beam onto a substantially parabolic reflective surface oriented to reflect the target-reflected laser beam to the focal point of the substantially parabolic surface, and detecting the laser beam from the substantially parabolic reflective surface using a detector located substantially at said focal point, said laser assembly including a pair of laser units, each laser unit comprising a pair of vertically spaced apart laser-generating devices, there being a substantially parabolic reflective surface associated with each of said pair of laser-generating devices each oriented to reflect target-reflective laser beams to the focal point thereof, said method further comprising the steps of directing each pair of said laser beams towards said target, and directing each pair of the laser-reflected beams onto the associated substantially parabolic reflective surface, and detecting each pair of the laser beams using a detector located substantially at the focal point of the associated substantially parabolic reflective surface.

15. A laser scanning apparatus for determining frame or unibody alignment of a vehicle comprising:

a housing;

a laser assembly located within said housing;

a pair of upright, rotatable mirrors within said housing and on opposite sides of said laser assembly, said laser assembly and mirrors oberable to direct a laser beam toward a vehicle-mounted reflective target; and a detector assembly for receiving target-reflected laser beams from said target, said detector assembly located within the housing and comprising a substantially parabolic reflective surface oriented to reflect said target-reflected laser beam to the focal point of the substantially parabolic reflective surface, and a detector located substantially at said focal point, said laser assembly including a pair of laser sources, each laser source comprising upper and lower, vertically spaced apart laser sources operable to direct respective, vertically spaced apart laser beams towards said vehicle-mounted target, said detector assembly including a pair of said substantially parabolic reflective surfaces each associated with corresponding upper and lower laser sources.

* * * * *

UNITED STATES PATENT AND TRADEMARK OFFICE
CERTIFICATE OF CORRECTION

PATENT NO. : 6,765,664 B2
DATED : July 20, 2004
INVENTOR(S) : David Scott Grouthuis and Michael Thomas Hanchett It is certified that error appears in the above-identified patent and that said Letters Patent is hereby corrected as shown below:

Column 20,
Line 39, delete "assebly" and insert -- assembly --.

Column 21,
Lines 21 and 22, delete "surface" and insert -- surfaces --.

Column 22,
Line 23, delete "oberable" and insert -- operable --.

Signed and Sealed this

Eighteenth Day of January, 2005

JON W. DUDAS
*Director of the United States Patent and Trademark Office*